（12) United States Patent
Venugopal et al.

(10) Patent No.: US 11,398,893 B2
(45) Date of Patent: Jul. 26, 2022

(54) REPORTING OF MULTIPLE COMPONENT CARRIERS OR FREQUENCY BANDS THAT SHARE QUASI CO-LOCATION INFORMATION

(71) Applicant: QUALCOMM Incorporated, San Diego, CA (US)

(72) Inventors: Kiran Venugopal, Raritan, NJ (US); Yan Zhou, San Diego, CA (US); Tianyang Bai, Somerville, NJ (US); Jung Ho Ryu, Fort Lee, NJ (US); Junyi Li, Chester, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 110 days.

(21) Appl. No.: 17/062,845

(22) Filed: Oct. 5, 2020

(65) Prior Publication Data

US 2021/0126761 A1 Apr. 29, 2021

Related U.S. Application Data

(60) Provisional application No. 62/926,349, filed on Oct. 25, 2019.

(51) Int. Cl.
*H04L 5/00* (2006.01)
*H04W 72/04* (2009.01)

(52) U.S. Cl.
CPC ............ *H04L 5/0098* (2013.01); *H04L 5/001* (2013.01); *H04L 5/0092* (2013.01);
(Continued)

(58) Field of Classification Search
CPC ........... H04W 72/042; H04W 72/0413; H04W 72/0453; H04L 5/001; H04L 5/0092; H04L 5/0098
See application file for complete search history.

(56) References Cited

U.S. PATENT DOCUMENTS

2018/0288755 A1* 10/2018 Liu .................. H04L 5/005
2020/0229161 A1* 7/2020 Raghavan ........... H04W 72/042
(Continued)

FOREIGN PATENT DOCUMENTS

WO WO-2018232090 A1 12/2018

OTHER PUBLICATIONS

International Search Report and Written Opinion—PCT/US2020/054430—ISA/EPO—dated Jan. 20, 2021 (200358WO).
(Continued)

*Primary Examiner* — Kevin C. Harper
(74) *Attorney, Agent, or Firm* — Holland & Hart LLP

(57) ABSTRACT

Methods, systems, and devices for wireless communications are described. In some systems, a user equipment (UE) may indicate a group of component carriers (CCs) or frequency bands that share quasi co-location (QCL) information. For example, a base station may indicate a set of CCs to a UE. The UE may report, to the base station, a group of CCs, bandwidth parts (BWPs), or both that share a QCL property. For example, the report may include a list of CCs, frequency bands, BWPs, frequency ranges (FRs), or some combination thereof sharing the same QCL property, or the report may indicate whether the CCs in a band share the same QCL property. Based on this report, the base station may activate a transmission configuration indicator (TCI) state at the UE, where the UE may activate the TCI state across the group of CCs, BWPs, or both sharing the same QCL property.

30 Claims, 15 Drawing Sheets

(52) U.S. Cl.
CPC ..... *H04W 72/042* (2013.01); *H04W 72/0413* (2013.01); *H04W 72/0453* (2013.01); *H04L 5/0037* (2013.01); *H04L 5/0094* (2013.01)

(56) References Cited

U.S. PATENT DOCUMENTS

2021/0067979 A1* 3/2021 Rahman ................ H04W 16/28
2021/0091900 A1* 3/2021 Zhang ................. H04W 56/001

OTHER PUBLICATIONS

Nokia et al., "Summary of QCL", 3GPP Draft; R1-1714970, 3GPP TSG RAN WG1 #90, 3rd Generation Partnership Project (3GPP), Mobile Competence Centre ; 650, Route Des Lucioles, F-06921 Sophia-Antipolis Cedex ; France, vol. RAN WG1, No. Prague, Czech Republic; Aug. 21, 2017-Aug. 25, 2017, Aug. 26, 2017 (Aug. 26, 2017), XP051328484, 12 Pages, Retrieved from the Internet: URL:http://www.3gpp.org/ftp/tsg_ran/WG1_RL1/TSGR1_90/Docs/ [retrieved on Aug. 26, 2017], p. 1, paragraph 3, p. 6, paragraph ZTE.

* cited by examiner

REPORTING OF MULTIPLE COMPONENT CARRIERS OR FREQUENCY BANDS THAT SHARE QUASI CO-LOCATION INFORMATION

CROSS REFERENCE

The present Application for Patent claims the benefit of U.S. Provisional Patent Application No. 62/926,349 by VENUGOPAL et al., entitled "REPORTING OF MULTIPLE COMPONENT CARRIERS OR FREQUENCY BANDS THAT SHARE QUASI CO-LOCATION INFORMATION," filed Oct. 25, 2019, assigned to the assignee hereof, and expressly incorporated by reference herein.

FIELD OF TECHNOLOGY

The following relates generally to wireless communications and more specifically to reporting of multiple component carriers (CCs) or frequency bands that share quasi co-location (QCL) information.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some systems, a UE, a base station, or both may implement beamforming to shape or steer an antenna beam (e.g., a transmit beam, a receive beam, or both) along a spatial path between the transmitting device and the receiving device. Each antenna beam may correspond to a transmission configuration indicator (TCI) state identifier (ID). A UE may activate a TCI state ID for a particular component carrier (CC) and may communicate with a base station using the antenna beam corresponding to the TCI state ID on the particular CC. In some cases, the base station may signal a TCI state activation to the UE. This TCI state activation message may increase the signaling overhead on the downlink channel, reducing the resources available for other messages or signals.

SUMMARY

The described techniques relate to improved methods, systems, devices, and apparatuses that support reporting of multiple component carriers (CCs) or frequency bands that share quasi co-location (QCL) information. Generally, the described techniques provide for reduced signaling overhead when activating a transmission configuration indicator (TCI) state across multiple CCs. In some systems, a base station may indicate a set of CCs to a user equipment (UE). The UE may report, to the base station, a group of CCs, bandwidth parts (BWPs), or both that share a QCL property. For example, the report may include a list of CCs, frequency bands, BWPs, frequency ranges (FRs), or some combination thereof sharing the same QCL property, or the report may indicate whether the CCs in a band share the same QCL property. Based on this report, the base station may activate a TCI state at the UE (e.g., by transmitting a medium access control (MAC) control element (CE) indicating the TCI state identifier (ID)). The UE may activate the TCI state across the group of CCs, BWPs, or both sharing the same QCL property. For example, the UE may select an antenna beam corresponding to the TCI state for communication on the group of CCs, BWPs, or both.

A method for wireless communications by a UE is described. The method may include receiving control signaling indicating a set of CCs or a set of BWPs, transmitting a group message indicating a subset of two or more of the set of CCs or the set of BWPs that share QCL information, receiving a control message indicating a first TCI state of a set of different TCI states is activated for each of the two or more of the set of CCs or the set of BWPs based on the group message, and monitoring at least one CC or at least one BWP of the subset for a downlink transmission that is transmitted in accordance with the first TCI state.

An apparatus for wireless communications by a UE is described. The apparatus may include a processor, memory coupled with the processor, and instructions stored in the memory. The instructions may be executable by the processor to cause the apparatus to receive control signaling indicating a set of CCs or a set of BWPs, transmit a group message indicating a subset of two or more of the set of CCs or the set of BWPs that share QCL information, receive a control message indicating a first TCI state of a set of different TCI states is activated for each of the two or more of the set of CCs or the set of BWPs based on the group message, and monitor at least one CC or at least one BWP of the subset for a downlink transmission that is transmitted in accordance with the first TCI state.

Another apparatus for wireless communications by a UE is described. The apparatus may include means for receiving control signaling indicating a set of CCs or a set of BWPs, transmitting a group message indicating a subset of two or more of the set of CCs or the set of BWPs that share QCL information, receiving a control message indicating a first TCI state of a set of different TCI states is activated for each of the two or more of the set of CCs or the set of BWPs based on the group message, and monitoring at least one CC or at least one BWP of the subset for a downlink transmission that is transmitted in accordance with the first TCI state.

A non-transitory computer-readable medium storing code for wireless communications by a UE is described. The code may include instructions executable by a processor to receive control signaling indicating a set of CCs or a set of BWPs, transmit a group message indicating a subset of two or more of the set of CCs or the set of BWPs that share QCL information, receive a control message indicating a first TCI state of a set of different TCI states is activated for each of the two or more of the set of CCs or the set of BWPs based on the group message, and monitor at least one CC or at least one BWP of the subset for a downlink transmission that is transmitted in accordance with the first TCI state.

In some examples of the method, apparatuses, and non-transitory computer-readable medium described herein, transmitting the group message may include operations, features, means, or instructions for transmitting the group message indicating a list that includes a set of CC identifiers or a set of BWP identifiers of the subset that share the QCL information.

In some examples of the method, apparatuses, and non-transitory computer-readable medium described herein, transmitting the group message may include operations, features, means, or instructions for transmitting the group message including a bit that may be set to a defined value to indicate that the subset includes all CCs of the set of CCs that are located within a frequency band of a set of different frequency bands.

In some examples of the method, apparatuses, and non-transitory computer-readable medium described herein, transmitting the group message may include operations, features, means, or instructions for transmitting the group message including a bit that may be set to a defined value to indicate that not all CCs of the set of CCs that are located within a frequency band of a set of different frequency bands share the QCL information.

In some examples of the method, apparatuses, and non-transitory computer-readable medium described herein, the control message may be an example of a downlink control message. Some examples of the method, apparatuses, and non-transitory computer-readable medium described herein may further include operations, features, means, or instructions for transmitting an uplink control message indicating that the subset includes a first subset of CCs of the set of CCs that are located within the frequency band that share the QCL information.

In some examples of the method, apparatuses, and non-transitory computer-readable medium described herein, transmitting the uplink control message may include operations, features, means, or instructions for transmitting the uplink control message indicating that the subset does not include a second subset of CCs of the set of CCs that are located within the frequency band that do not share the QCL information.

In some examples of the method, apparatuses, and non-transitory computer-readable medium described herein, transmitting the group message may include operations, features, means, or instructions for transmitting a list of one or more frequency bands, where the subset includes all CCs of the set of CCs or all BWPs of the set of BWPs within a first frequency band of the one or more frequency bands.

In some examples of the method, apparatuses, and non-transitory computer-readable medium described herein, the subset of two or more of the set of CCs or the set of BWPs is an example of a first subset of two or more of the set of CCs or the set of BWPs, and a second subset of two or more of the set of CCs or the set of BWPs includes all CCs of the set of CCs or all BWPs of the set of BWPs within a second frequency band of the one or more frequency bands, where the second subset shares second QCL information.

In some examples of the method, apparatuses, and non-transitory computer-readable medium described herein, the list indicates a starting band index and an ending band index for each of the one or more frequency bands.

In some examples of the method, apparatuses, and non-transitory computer-readable medium described herein, the list indicates an FR for each of the one or more frequency bands.

In some examples of the method, apparatuses, and non-transitory computer-readable medium described herein, a first FR of the one or more frequency bands may be frequency range 1 (FR1) or frequency range 2 (FR2).

Some examples of the method, apparatuses, and non-transitory computer-readable medium described herein may further include operations, features, means, or instructions for receiving a grant indicating the downlink transmission may be scheduled on the at least one CC or at least one BWP of the subset and receiving, via the at least one CC or at least one BWP of the subset, the downlink transmission using a receive beam that corresponds to the first TCI state.

In some examples of the method, apparatuses, and non-transitory computer-readable medium described herein, receiving the control signaling may include operations, features, means, or instructions for receiving radio control signaling indicating the set of CCs or BWPs, and receiving the control message may include operations, features, means, or instructions for receiving a MAC CE indicating the first TCI state.

A method for wireless communications by a base station is described. The method may include transmitting control signaling indicating a set of CCs or a set of BWPs, receiving a group message indicating a subset of two or more of the set of CCs or the set of BWPs that share QCL information, transmitting a control message indicating a first TCI state of a set of different TCI states is activated for each of the two or more of the set of CCs or the set of BWPs based on the group message, and transmitting, via at least one CC or at least one BWP of the subset, a downlink transmission in accordance with the first TCI state.

An apparatus for wireless communications by a base station is described. The apparatus may include a processor, memory coupled with the processor, and instructions stored in the memory. The instructions may be executable by the processor to cause the apparatus to transmit control signaling indicating a set of CCs or a set of BWPs, receive a group message indicating a subset of two or more of the set of CCs or the set of BWPs that share QCL information, transmit a control message indicating a first TCI state of a set of different TCI states is activated for each of the two or more of the set of CCs or the set of BWPs based on the group message, and transmit, via at least one CC or at least one BWP of the subset, a downlink transmission in accordance with the first TCI state.

Another apparatus for wireless communications by a base station is described. The apparatus may include means for transmitting control signaling indicating a set of CCs or a set of BWPs, receiving a group message indicating a subset of two or more of the set of CCs or the set of BWPs that share QCL information, transmitting a control message indicating a first TCI state of a set of different TCI states is activated for each of the two or more of the set of CCs or the set of BWPs based on the group message, and transmitting, via at least one CC or at least one BWP of the subset, a downlink transmission in accordance with the first TCI state.

A non-transitory computer-readable medium storing code for wireless communications by a base station is described. The code may include instructions executable by a processor to transmit control signaling indicating a set of CCs or a set of BWPs, receive a group message indicating a subset of two or more of the set of CCs or the set of BWPs that share QCL information, transmit a control message indicating a first TCI state of a set of different TCI states is activated for each of the two or more of the set of CCs or the set of BWPs based on the group message, and transmit, via at least one CC or at least one BWP of the subset, a downlink transmission in accordance with the first TCI state.

In some examples of the method, apparatuses, and non-transitory computer-readable medium described herein, receiving the group message may include operations, features, means, or instructions for receiving the group message indicating a list that includes a set of CC identifiers or a set of BWP identifiers of the subset that share the QCL information.

In some examples of the method, apparatuses, and non-transitory computer-readable medium described herein, receiving the group message may include operations, features, means, or instructions for receiving the group message including a bit that may be set to a defined value to indicate that the subset includes all CCs of the set of CCs that are located within a frequency band of a set of different frequency bands.

In some examples of the method, apparatuses, and non-transitory computer-readable medium described herein, receiving the group message may include operations, features, means, or instructions for receiving the group message including a bit that may be set to a defined value to indicate that not all CCs of the set of CCs that are located within a frequency band of a set of different frequency bands share the QCL information.

In some examples of the method, apparatuses, and non-transitory computer-readable medium described herein, the control message may be an example of a downlink control message. Some examples of the method, apparatuses, and non-transitory computer-readable medium described herein may further include operations, features, means, or instructions for receiving an uplink control message indicating that the subset includes a first subset of CCs of the set of CCs that are located within the frequency band that share the QCL information.

In some examples of the method, apparatuses, and non-transitory computer-readable medium described herein, receiving the uplink control message may include operations, features, means, or instructions for receiving the uplink control message indicating that the subset does not include a second subset of CCs of the set of CCs that are located within the frequency band that do not share the QCL information.

In some examples of the method, apparatuses, and non-transitory computer-readable medium described herein, receiving the group message may include operations, features, means, or instructions for receiving a list of one or more frequency bands, where the subset includes all CCs of the set of CCs or all BWPs of the set of BWPs within a first frequency band of the one or more frequency bands.

In some examples of the method, apparatuses, and non-transitory computer-readable medium described herein, the subset of two or more of the set of CCs or the set of BWPs is an example of a first subset of two or more of the set of CCs or the set of BWPs, and a second subset of two or more of the set of CCs or the set of BWPs includes all CCs of the set of CCs or all BWPs of the set of BWPs within a second frequency band of the one or more frequency bands, where the second subset shares second QCL information.

In some examples of the method, apparatuses, and non-transitory computer-readable medium described herein, the list indicates a starting band index and an ending band index for each of the one or more frequency bands.

In some examples of the method, apparatuses, and non-transitory computer-readable medium described herein, the list indicates an FR for each of the one or more frequency bands.

In some examples of the method, apparatuses, and non-transitory computer-readable medium described herein, a first FR of the one or more frequency bands may be FR1 or FR2.

Some examples of the method, apparatuses, and non-transitory computer-readable medium described herein may further include operations, features, means, or instructions for transmitting a grant indicating the downlink transmission may be scheduled on the at least one CC or at least one BWP of the subset.

In some examples of the method, apparatuses, and non-transitory computer-readable medium described herein, transmitting the control signaling may include operations, features, means, or instructions for transmitting radio control signaling indicating the set of CCs or BWPs, and transmitting the control message may include operations, features, means, or instructions for transmitting a MAC CE indicating the first TCI state.

DETAILED DESCRIPTION

Some wireless communications systems may support beamforming to shape or steer an antenna beam (e.g., a communication beam, such as a transmit beam, a receive beam, or both) along a spatial path between a transmitting device and a receiving device. Each antenna beam may correspond to a transmission configuration indicator (TCI)

state identifier (ID). A user equipment (UE) may activate a TCI state ID for a particular component carrier (CC) and may communicate with a base station using the antenna beam corresponding to the TCI state ID on the particular CC. In some cases, the base station may signal a TCI state activation to the UE. This TCI state activation message may increase the signaling overhead on the downlink channel, reducing the resources available for other messages or signals.

Wireless communications systems described herein may support activation of a TCI state across a group of CCs, bandwidth parts (BWPs), or both sharing the same quasi co-location (QCL) property. By activating a TCI state across multiple CCs (e.g., using a single TCI state activation message), a wireless device may reduce the signaling overhead involved in TCI state activation. A base station may transmit control signaling that indicates a set of CCs to a UE. In some cases, a UE may apply the same set of physical downlink shared channel (PDSCH) TCI state IDs to all BWPs in the indicated CCs, effectively reducing the signaling overhead on a downlink channel (e.g., as compared to the base station signaling separate TCI state IDs for different BWPs within a CC or set of CCs).

In some examples, the UE may report to the base station multiple CCs, BWPs, or both that share the same QCL property. For example, this report may include a list of CCs, frequency bands, BWPs, frequency ranges (FRs), or some combination thereof sharing the same QCL property, or this report may indicate whether the CCs in a band share the same QCL property. In response to receiving the report, the base station may activate a TCI state at the UE, where the UE may correspondingly update the TCI state for all CCs at the UE that share the QCL property. The UE may monitor for downlink transmissions using a communication beam (e.g., a receive beam, a transmit beam, or both) corresponding to the updated TCI state for each of these CCs. As such, based on the UE reporting multiple CCs or frequency bands that share QCL information, the base station may activate a TCI state for multiple CCs at the UE using a single activation message.

Aspects of the disclosure are initially described in the context of wireless communications systems. Aspects of the disclosure are further illustrated by and described with reference to process flows, apparatus diagrams, system diagrams, and flowcharts that relate to reporting of multiple CCs or frequency bands that share QCL information.

Figure 1:
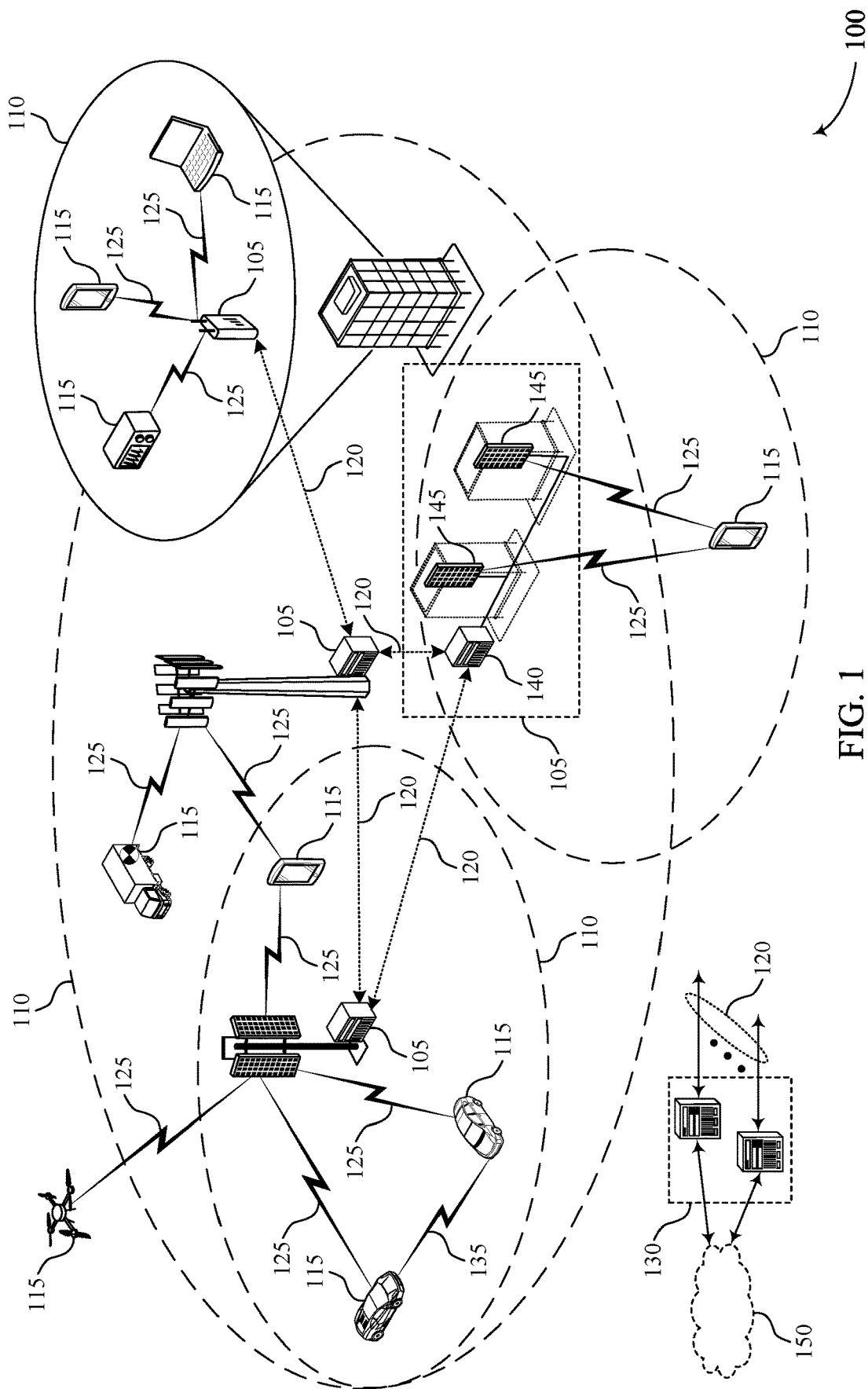
FIGS. 1 and 2 illustrate examples of wireless communications systems that support reporting of multiple component carriers (CCs) or frequency bands that share quasi co-location (QCL) information in accordance with aspects of the present disclosure.

FIG. 1 illustrates an example of a wireless communications system 100 that supports reporting of multiple CCs or frequency bands that share QCL information in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a BWP) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink CCs and one or more uplink CCs according to a carrier aggregation configuration. Carrier aggregation may be used with both frequency division duplexing (FDD) and time division duplexing (TDD) CCs.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with CCs operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

In some wireless communications systems 100, a UE 115 may report multiple CCs, BWPs, or both that share the same QCL property. For example, the UE 115 may transmit an uplink message to a base station 105 indicating a list of CCs that share QCL information, a list of bands, BWPs, FRs, or a combination thereof that share QCL information, or an indication of whether the CCs of a band share QCL information. The base station 105 may receive the uplink message—which may be referred to as a group message, indicating a group of resources that share the same QCL information—and may activate a TCI state at the UE 115, where the UE 115 may correspondingly update the TCI state for all CCs at the UE 115 sharing QCL information. The UE 115 may monitor for downlink transmissions using a communication beam (e.g., a receive beam, a transmit beam, or both) corresponding to the updated TCI state for each of these CCs. As such, based on the reporting of multiple CCs or frequency bands that share QCL information, the base station 105 may activate a TCI state for multiple CCs at the UE 115 using a single activation message (e.g., a single MAC control element (CE)).

Figure 2:
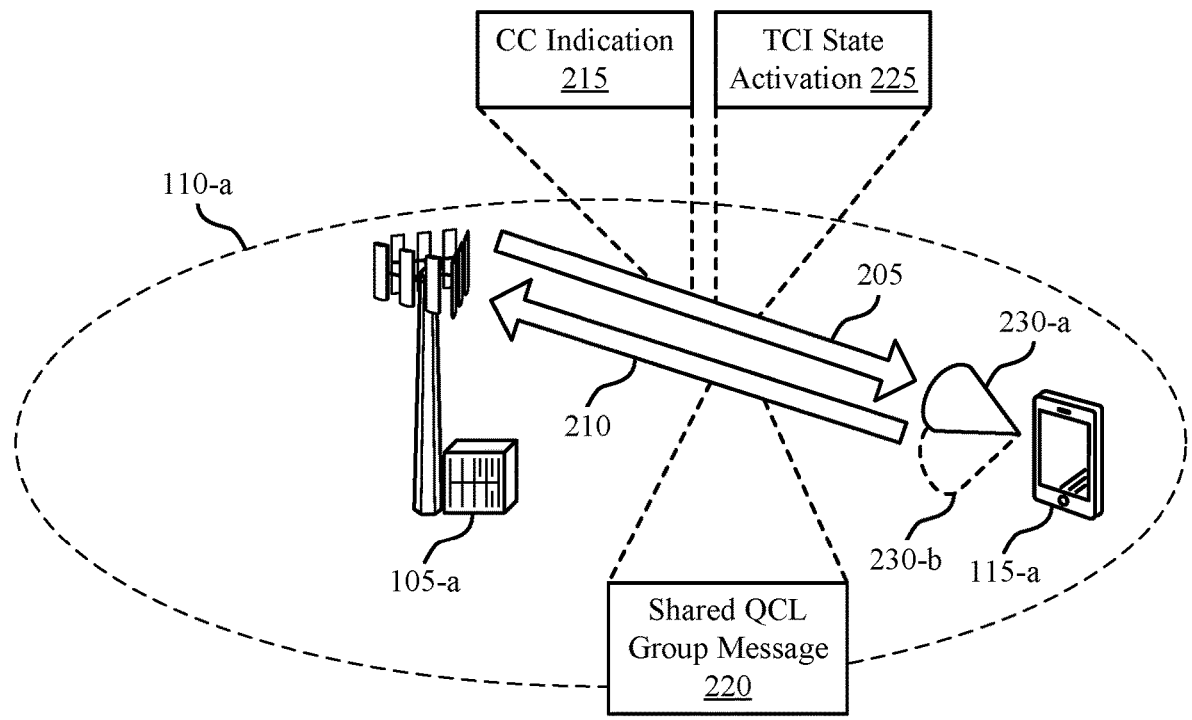

FIG. 2 illustrates an example of a wireless communications system 200 that supports reporting of multiple CCs or frequency bands that share QCL information in accordance with aspects of the present disclosure. The wireless communications system 200 may be an example of a wireless communications system 100. The wireless communications system 200 may include base station 105-*a* and UE 115-*a*, which may be examples of the corresponding wireless devices as described with reference to FIG. 1. Base station 105-*a* may provide network coverage for a geographic coverage area 110-*a*. In some cases, base station 105-*a*, UE 115-*a*, or both may implement beamforming techniques for wireless communications (e.g., on a downlink channel 205, an uplink channel 210, or both). For example, UE 115-*a* may implement a first antenna beam 230-*a* (e.g., a first receive beam, a first transmit beam, or both), a second antenna beam 230-*b* (e.g., a second receive beam, a second transmit beam, or both), or a combination thereof for communicating with base station 105-*a*. Each antenna beam 230 at UE 115-*a* may correspond to a TCI state ID, where a TCI state ID is a number indicating spatial resources in particular directions. In some cases, UE 115-*a* may implement the same antenna beam 230 (e.g., corresponding to the same TCI state ID) across multiple CCs if those CCs share the same QCL information.

Base station 105-*a* may indicate a set of CCs to UE 115-*a* in a CC indication 215. For example, base station 105-*a* may configure multiple CCs for UE 115-*a* via radio resource control (RRC) signaling or other configuration signaling. Base station 105-*a* may use this set of CCs for activating a set of TCI state IDs (e.g., for a PDSCH) using a MAC CE. For example, base station 105-*a* may use a single MAC CE to activate one or more TCI state IDs (e.g., corresponding to PDSCH beams) across all of the CCs in the defined set of CCs. In some cases, UE 115-*a* may apply the same set of PDSCH TCI state IDs to all BWPs in the indicated CCs, effectively reducing the signaling overhead on the downlink channel 205 (e.g., as compared to base station 105-*a* signaling separate TCI state IDs for different BWPs within a CC or set of CCs). Specifically, when a set of TCI state IDs for a PDSCH are activated by a MAC CE (e.g., a TCI state activation 225) for a set of CCs, BWPs, or both at least for the same band, where the applicable list of CCs is indicated by RRC signaling (e.g., a CC indication 215), UE 115-*a* may apply the same set of TCI state IDs for all of the BWPs in the indicated CCs. In some examples, the supported combinations of CCs that may be configured by RRC signaling may be based on a UE capability of UE 115-*a*.

In some implementations, UE 115-*a* or base station 105-*a* may implement a shared QCL group message 220 to support resource grouping and indication. For example, UE 115-*a* may report multiple CCs, BWPs, or both that share the same QCL information (e.g., the same analog beamformer) to base station 105-*a*. Alternatively, base station 105-*a* may report to UE 115-*a* multiple CCs, BWPs, or both that share the same QCL information at base station 105-*a*. If base station 105-*a* requests or commands UE 115-*a* to activate a TCI state ID for one CC in a group of CCs sharing the same QCL information, and another TCI state with the same TCI state ID is supported for another CC sharing the same QCL information, UE 115-*a* may additionally activate the TCI state for this other CC.

In a first implementation, a wireless device (e.g., UE 115-*a*, base station 105-*a*, or both) may signal a grouping of CCs using a list of CCs. For example, UE 115-*a* may transmit a shared QCL group message 220 including a list of CCs that belong to a particular group, where all CCs in the same group can support activating a same TCI state. The CCs in the list may be continuous or discontinuous. Indicating the group of CCs by a list may support grouping flexibility at UE 115-*a*, as UE 115-*a* may indicate which specific CCs in an operating frequency band share the same QCL information, which do not, or both. The shared QCL group message 220 may indicate the list of CCs using CC IDs, BWP IDs, or some combination of these or other CC indicators or identifiers. The shared QCL group message 220 may be an example of a UE capability message or any other type of message.

In a second implementation, a wireless device (e.g., UE 115-*a*, base station 105-*a*, or both) may signal a grouping of CCs using an indication of whether a frequency band, FR, or BWP uses the same QCL information. For example, UE 115-*a* may transmit a shared QCL group message 220 including a bit indicating if each band shares the same QCL information. Different frequency bands may or may not share the same QCL information depending on the value of the bit. In some examples, a bit value of 1 may indicate that all CCs in a particular frequency band share the same QCL information (e.g., a same QCL property), while a bit value of 0 may indicate that the CCs in the particular frequency band do not all share the same QCL information (e.g., at least one CC in the band has a different QCL property than at least one other CC in the band). Alternatively, a bit value of 1 may indicate that the CCs do not all share the same QCL information and a bit value of 0 may indicate that all of the CCs share the same QCL information. If UE 115-*a* indicates that the CCs in a frequency band do not all share the same QCL information, UE 115-*a* may signal explicit group information for the CCs in the band separately. By using one bit to indicate grouping information for each operating band in an FR, the UE 115-*a* may significantly reduce the signaling overhead of the shared QCL group message 220 (e.g., as opposed to transmitting grouping information per CC).

In a third implementation, a wireless device (e.g., UE 115-*a*, base station 105-*a*, or both) may signal a grouping of CCs using a list of bands, BWPs, FRs, or a combination thereof. For example, UE 115-*a* may transmit a shared QCL group message 220 indicating a list of frequency bands in which the CCs share the same QCL information. In some cases, the list of bands may be continuous, and UE 115-*a* may indicate the list of bands using a start band index and an end band index. In some other cases, UE 115-*a* may indicate a set of bands using an FR (e.g., FR1 or FR2) containing the set of bands. For example, four operating bands may be defined for FR2 (e.g., indexed as n257, n258, n260, and n261), as illustrated in Table 1.

TABLE 1

Operating Band Information for FR2

| Operating Band | Uplink Operating Band ($F_{UL\_low}$-$F_{UL\_high}$) | Downlink Operating Band ($F_{DL\_low}$-$F_{DL\_high}$) | Duplex Mode |
| --- | --- | --- | --- |
| n257 | 26500 MHz-29500 MHz | 26500 MHz-29500 MHz | TDD |
| n258 | 24250 MHz-27500 MHz | 24250 MHz-27500 MHz | TDD |
| n260 | 37000 MHz-40000 MHz | 37000 MHz-40000 MHz | TDD |
| n261 | 27500 MHz-28350 MHz | 27500 MHz-28350 MHz | TDD |

UE 115-a may indicate a group of CCs using a list of bands (e.g., by indicating indexes n257 and n258), where all of the CCs in the listed bands share the same QCL property. Alternatively, UE 115-a may indicate a group of CCs using a list of FRs (e.g., by indicating FR2), where all of the CCs in the listed FRs share the same QCL property. For example, UE 115-a may transmit a shared QCL group message 220 indicating a first group of CCs including all CCs in all bands of FR1 and a second group of CCs including all CCs in all bands of FR2.

Additionally, or alternatively, the wireless devices may implement some combination of the implementations described herein. For example, if all CCs in a band share a QCL property, UE 115-a may implement the second implementation, the third implementation, or a combination thereof as described herein. If not all CCs in the band share the QCL property, UE 115-a may implement the first implementation to flexibly group CCs within an operating band into multiple different groups. In some examples, UE 115-a may be configured with an implementation for reporting multiple CCs, BWPs, or both sharing the same QCL information or the same analog beamformer (e.g., pre-configured or configured by base station 105-a).

Base station 105-a may receive the shared QCL group message 220 and may use the reported information to activate a TCI state across multiple CCs (e.g., using a single MAC CE). For example, base station 105-a may transmit a TCI state activation 225 (e.g., a MAC CE) indicating a TCI state ID for UE 115-a. UE 115-a may receive the TCI state activation 225 and may activate the TCI state across multiple CCs of a same group (e.g., as indicated in the shared QCL group message 220). For example, UE 115-a may select an antenna beam 230 (e.g., a communication beam, a receive beam, a transmit beam, etc.) corresponding to the PDSCH TCI state to use for each CC sharing the same QCL information and supporting the indicated TCI state. Accordingly, base station 105-a may activate one antenna beam 230 (e.g., antenna beam 230-a) across multiple CCs concurrently using a single MAC CE, saving signaling overhead on the downlink channel 205 (e.g., as compared to activating antenna beams 230 for multiple CCs using multiple separate messages).

UE 115-a may use the activated antenna beam 230-a corresponding to the activated TCI state ID for communications with base station 105-a. For example, UE 115-a may receive downlink messages from base station 105-a using the activated antenna beam 230-a, transmit uplink messages to base station 105-a using the activated antenna beam 230-a, or both. In some examples, UE 115-a may monitor the downlink channel 205 using the activated antenna beam 230-a—and, correspondingly, the activated TCI state—on at least one of the CCs or BWPs in the activated group, and base station 105-a may transmit a downlink message to UE 115-a according to the activated antenna beam 230-a on the at least one of the CCs or BWPs.

Figure 3:
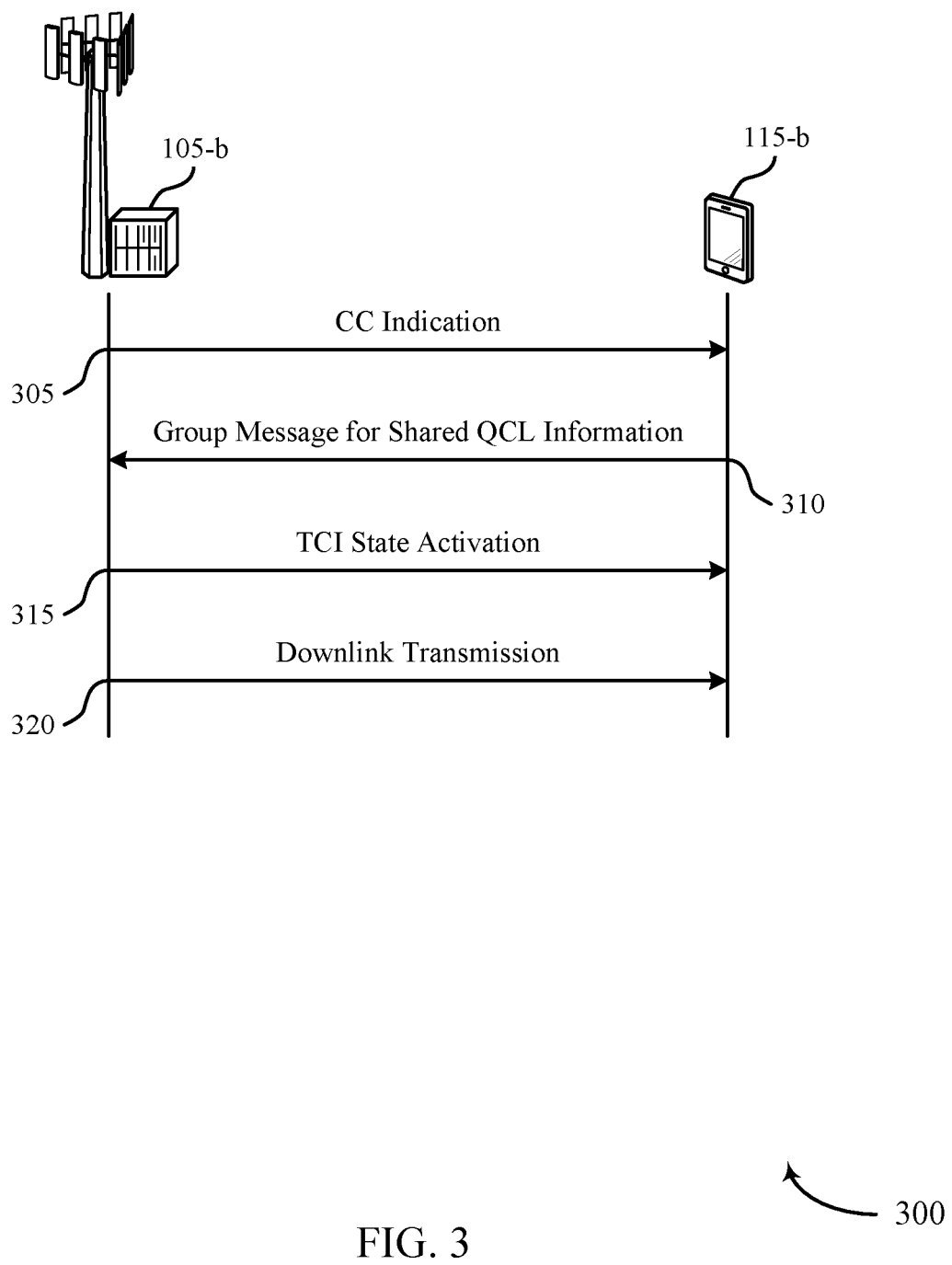
FIGS. 3 and 4 illustrate examples of process flows that support reporting of multiple CCs or frequency bands that share QCL information in accordance with aspects of the present disclosure.

FIG. 3 illustrates an example of a process flow 300 that supports reporting of multiple CCs or frequency bands that share QCL information in accordance with aspects of the present disclosure. The process flow 300 may include base station 105-b and UE 115-b, which may be examples of the corresponding wireless devices as described with reference to FIGS. 1 and 2. UE 115-b may report CCs, BWPs, or both that share the same QCL information to base station 105-b. In some cases, instead of UE 115-b reporting the group of CCs sharing QCL information, a different type of wireless device (e.g., a base station 105) may perform the reporting. Alternative examples of the following may be implemented, where some processes are performed in a different order than described or are not performed at all. In some cases, processes may include additional features not mentioned below, or further processes may be added.

At 305, base station 105-b may transmit control signaling indicating a set of CCs or a set of BWPs to UE 115-b. UE 115-b may receive the control signaling indicating the set of CCs or the set of BWPs. In some cases, the control signaling may be an example of RRC signaling.

At 310, UE 115-b may transmit a message (e.g., a group message) indicating a subset of two or more of the set of CCs or the set of BWPs that share QCL information. Base station 105-b may receive the group message from UE 115-b. CCs that share QCL information may share a same QCL property. In some cases, the group message may indicate a list that includes a set of CC IDs or a set of BWP IDs of the subset that share the QCL information.

In some other cases, the group message may include a bit that is set to a defined value to indicate either that the subset includes all CCs of the set of CCs that are located within a frequency band of a set of different frequency bands (e.g., if the bit is set to a 1 bit value) or that not all CCs of the set of CCs that are located within the frequency band of the set of different frequency bands share the QCL information (e.g., if the bit is set to a 0 bit value). For example, the bit may indicate if the CCs in a specific band share the same QCL information. If the CCs in a band do not all share the same QCL information, in some cases, UE 115-b may transmit a control message indicating explicit group information for the band. For example, UE 115-b may transmit a control message, to base station 105-b, indicating that the subset includes a first subset of CCs of the set of CCs that are located within the frequency band and that share the QCL information, that the subset does not include a second subset of CCs of the set of CCs that are located within the frequency band and that do not share the QCL information, or both.

In yet some other cases, the group message may include a list of one or more frequency bands, where the subset of two or more of the set of CCs or the set of BWPs that share QCL information includes all CCs of the set of CCs or all BWPs of the set of BWPs within a first frequency band of the one or more frequency bands. For example, UE 115-b may transmit a list of frequency bands in which the CCs share the same QCL information. In some cases, a second subset of two or more of the set of CCs or the set of BWPs includes all CCs of the set of CCs or all BWPs of the set of BWPs within a second frequency band of the one or more frequency bands, where the second subset shares second QCL information (e.g., different from the QCL information for the first subset). In some examples, the list of one or more frequency bands indicates an FR for each of the one or more frequency bands, where the FR may be FR1 or FR2.

At 315, base station 105-*b* may transmit a control message indicating that a first TCI state of a set of different TCI states is activated for each of the two or more of the set of CCs or the set of BWPs based on the group message received from UE 115-*b*. UE 115-*b* may receive the control message indicating the first TCI state and may activate the first TCI state across the two or more of the set of CCs or the set of BWPs. In some cases, the control message may be an example of a MAC CE indicating the TCI state ID for the first TCI state.

At 320, base station 105-*b* may transmit, via at least one CC or at least one BWP of the subset, a downlink transmission in accordance with the first TCI state. For example, the base station 105-*b* may transmit a grant indicating that the downlink transmission is scheduled on the at least one CC or the at least one BWP of the subset. UE 115-*b* may receive the downlink grant, the downlink transmission, or both using a receive beam that corresponds to the first TCI state.

Figure 4:
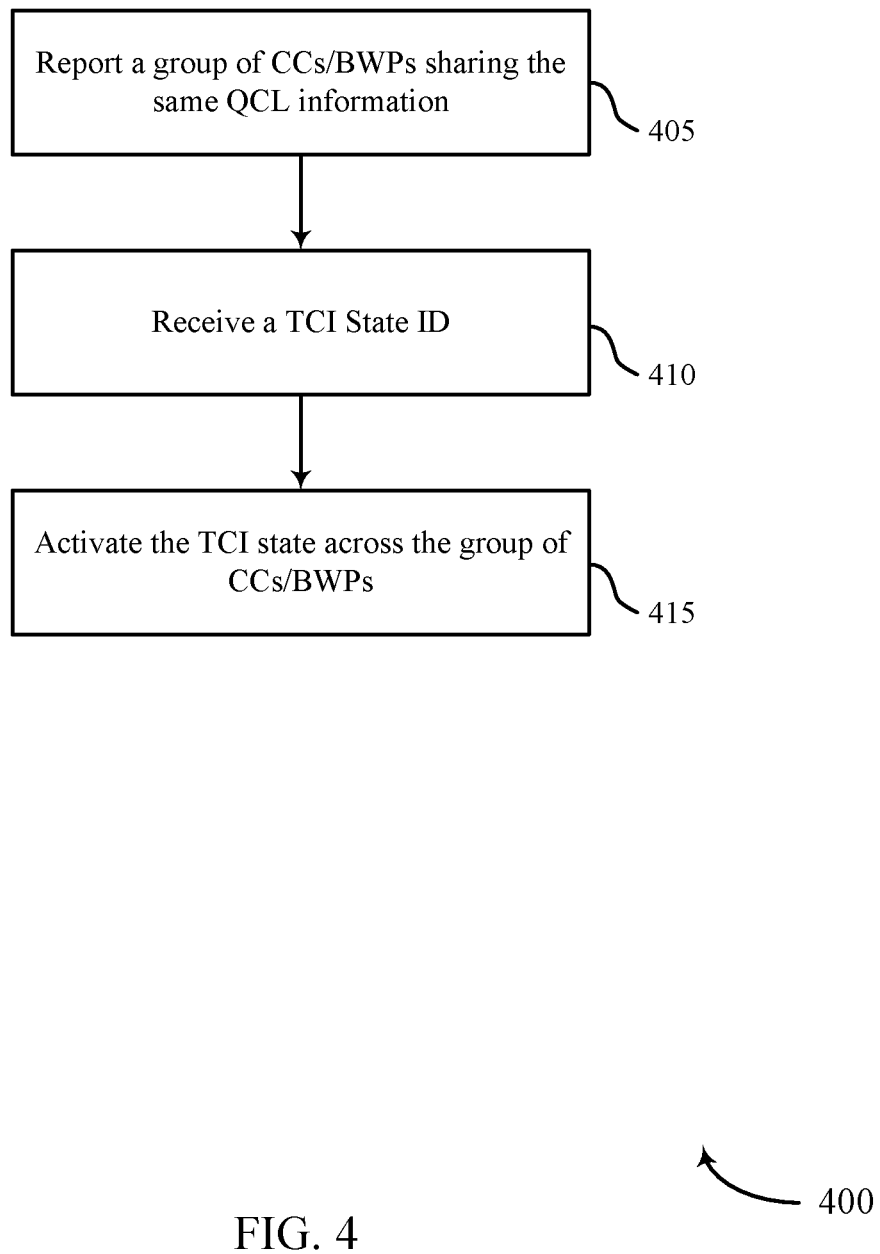

FIG. 4 illustrates an example of a process flow 400 that supports reporting of multiple CCs or frequency bands that share QCL information in accordance with aspects of the present disclosure. The process flow 400 may be performed by a wireless device, such as a UE 115 or a base station 105 as described with reference to FIGS. 1 through 3.

At 405, the wireless device may report a group of CCs, BWPs, or both sharing the same QCL information (e.g., a same QCL property) to another wireless device. For example, a UE 115 may report the group information. In some cases, the wireless device may indicate a group of CCs sharing QCL information using a list (e.g., a list of CC IDs). In some other cases, the wireless device may indicate if the CCs in a frequency band share the same QCL information using a bit indicator or bit field. In yet some other cases, the wireless device may indicate the group of CCs sharing QCL information using a list of bands, BWPs, FRs, or some combination thereof, where each CC within the indicated list of bands, BWPs, FRs, or combination thereof share QCL information.

At 410, the wireless device may receive a TCI state ID. For example, a UE 115 may receive a MAC CE or another message from a base station 105 indicating the TCI state ID for the reported group of CCs, BWPs, or both sharing the same QCL information. At 415, the wireless device may activate the TCI state ID across the group of CCs, BWPs, or both sharing the same QCL information. For example, the UE 115 may select an antenna beam (e.g., a communication beam, a receive beam, a transmit beam, etc.) corresponding to the TCI state ID for communication with the base station 105. The UE 115 may use this antenna beam corresponding to the TCI state ID for the group of CCs, BWPs, or both sharing the same QCL information.

Figure 5:
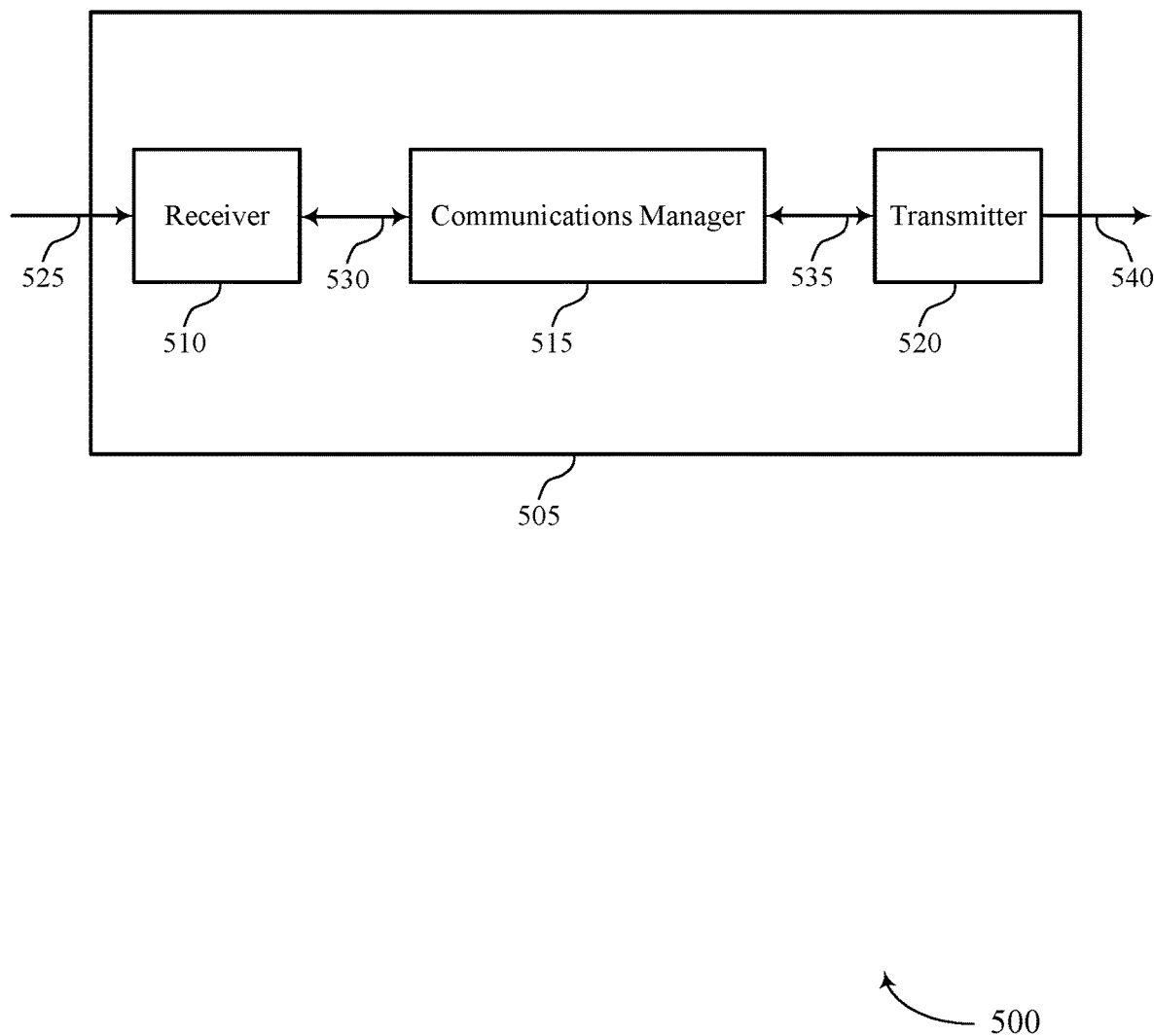
FIGS. 5 and 6 show block diagrams of devices that support reporting of multiple CCs or frequency bands that share QCL information in accordance with aspects of the present disclosure.

FIG. 5 shows a block diagram 500 of a device 505 that supports reporting of multiple CCs or frequency bands that share QCL information in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information 525 such as packets, user data, or control information associated with various information channels (e.g., control channels, data channels, or both). For example, the receiver 510 may demodulate signals received over monitored time-frequency resources to obtain bits that indicate the information 525. The receiver 510 may pass this information, as information 530, on to other components of the device 505. For example, the receiver 510 may electrically send the information 530 received from another device (e.g., a base station 105)—such as control signaling, TCI state information, downlink control channel information (e.g., monitoring results of a decoding candidate), other downlink transmissions, and the like—to the communications manager 515. The receiver 510 may be an example of aspects of the transceiver 820 described with reference to FIG. 8. The receiver 510 may utilize a single antenna or a set of antennas.

The communications manager 515 may receive control signaling indicating a set of CCs or a set of BWPs, transmit a group message indicating a subset of two or more of the set of CCs or the set of BWPs that share QCL information, receive a control message indicating that a first TCI state of a set of different TCI states is activated for each of the two or more of the set of CCs or the set of BWPs based on the group message, and monitor at least one CC or at least one BWP of the subset for a downlink transmission that is transmitted in accordance with the first TCI state. For example, the communications manager 515 may receive the control signaling, the control message indicating the first TCI state, monitoring information for at least one CC or at least one BWP, or some combination thereof as the information 530. Additionally, or alternatively, the communications manager 515 may transmit the group message by passing information 535 (e.g., a set of payload bits for encoding) to the transmitter 520. The communications manager 515 may be an example of aspects of the communications manager 810 described herein.

The actions performed by the communications manager 515 as described herein may be implemented to realize one or more potential advantages. One implementation may enable a wireless device, such as a UE 115, to apply a TCI state across multiple BWPs, multiple CCs, or both based on a single control message (e.g., an activation message), effectively reducing the signaling overhead on a downlink channel (e.g., as compared to a base station 105 signaling separate TCI state IDs for different BWPs within a CC or set of CCs). Additionally, or alternatively, the UE 115 may dynamically indicate the CCs or frequency bands that share QCL information, allowing a base station 105 to dynamically determine how to activate a TCI state for multiple CCs at the UE 115 using a single activation message.

Based on receiving a control message activating a TCI state for multiple CCs or BWPs as described herein, a processor of the UE 115 (e.g., a processor controlling the receiver 510, the communications manager 515, the transmitter 520, or a combination thereof) may reduce processing resources used for control channel monitoring, reception, or both. For example, the processor may perform a single reception and decoding process in order to activate a TCI state for multiple CCs, BWPs, or both, as opposed to multiple reception and decoding processes corresponding to each of the different CCs, BWPs, or both. Reducing the number of control messages received by the UE 115 may reduce the number of times the processor turns on processing units to handle control message reception and decoding, and the processor may reduce the amount of time that the processing units remain active.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas. For example, the transmitter 520 may receive information 535 and transmit information 540 over a channel. In some cases, the information 535 may include payload bits for transmission, and the transmitter 520 may encode the payload bits into a message (e.g., a group message indicating a subset of two or more of the set of CCs or the set of BWPs that share QCL information), identify time-frequency resources over which the message is to be transmitted, and modulate the transmission over the identified time-frequency resources. The transmitted message may include the information 540.

Figure 6:
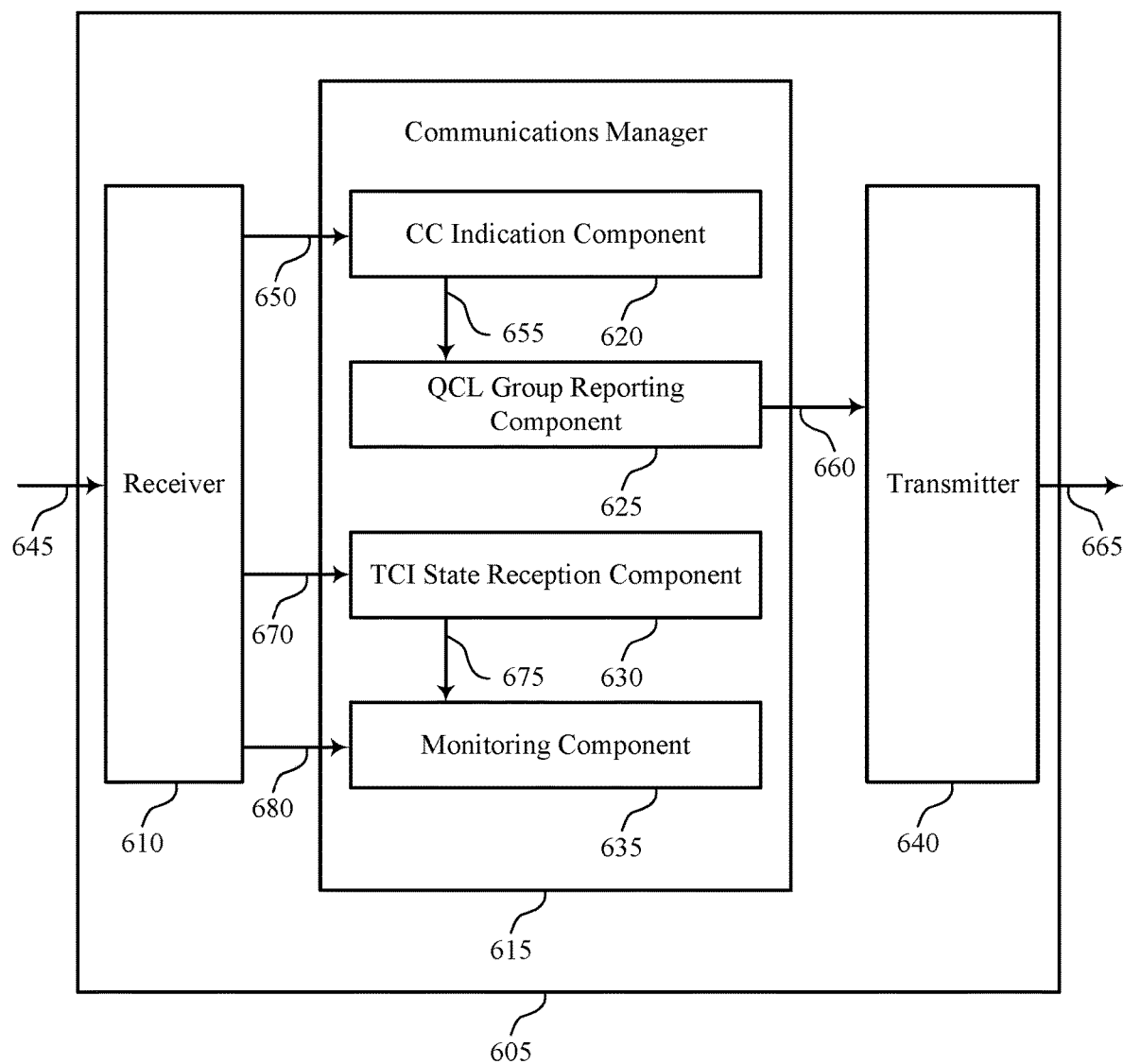

FIG. 6 shows a block diagram 600 of a device 605 that supports reporting of multiple CCs or frequency bands that share QCL information in accordance with aspects of the present disclosure. The device 605 may be an example of aspects of a device 505 or a UE 115 as described herein. The device 605 may include a receiver 610, a communications manager 615, and a transmitter 640. The device 605 may also include a processor. Each of these components may be in communication with one another (e.g., via one or more buses).

The receiver 610 may receive information 645 such as packets, user data, or control information associated with various information channels (e.g., control channels, data channels, and information channels related to reporting of multiple CCs or frequency bands that share QCL information, etc.). The information 645 may be an example of a modulated signal representing payload information for a message (e.g., a control message, a data message, etc.). Information may be passed on to other components of the device 605. For example, the receiver 610 may electrically send information received from another device (e.g., a base station 105), such as control signaling information, TCI state activation information, downlink data, and the like, to the communications manager 615. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a CC indication component 620, a QCL group reporting component 625, a TCI state reception component 630, and a monitoring component 635. The communications manager 615 may be an example of aspects of the communications manager 810 described herein.

The CC indication component 620 may receive control signaling indicating a set of CCs or a set of BWPs. For example, the CC indication component 620 may receive a set of bits indicating the control information 650 from the receiver 610. The CC indication component 620 may determine the set of CCs or the set of BWPs based on the control information 650 and may output a set of bits 655 indicating the set of CCs or the set of BWPs to the QCL group reporting component 625.

The QCL group reporting component 625 may transmit a group message indicating a subset of two or more of the set of CCs or the set of BWPs that share QCL information. For example, the QCL group reporting component 625 may receive the set of bits 655 indicating the set of CCs or the set of BWPs and may determine QCL information for each CC, each BWP, or both. By comparing the QCL information for the CCs, BWPs, or both, the QCL group reporting component 625 may determine which of the set of CCs or the set of BWPs share QCL information. The QCL group reporting component 625 may output a set of bits 660 indicating a subset of two or more of the set of CCs or the set of BWPs that share QCL information to the transmitter 640 for transmission in an uplink message (e.g., a group message). For example, the set of bits 660 may indicate two or more CC indices, two or more BWP indices, or a combination thereof.

The TCI state reception component 630 may receive a control message indicating a first TCI state of a set of different TCI states is activated for each of the two or more of the set of CCs or the set of BWPs based on the group message. For example, the TCI state reception component 630 may receive a set of bits indicating control information 670 (e.g., corresponding to the control message) from the receiver 610. The TCI state reception component 630 may determine to activate the first TCI state for each of the two or more of the set of CCs or the set of BWPs based on the control information 670 and may output information 675 indicating the activated TCI state to the monitoring component 635.

The monitoring component 635 may monitor at least one CC or at least one BWP of the subset for a downlink transmission that is transmitted in accordance with the first TCI state. For example, the monitoring component 635 may receive the information 675 indicating the activated TCI state and may use the indicated activated TCI state for monitoring at least one CC or at least one BWP of the subset of two or more of the set of CCs or the set of BWPs that share QCL information. The monitoring component 635 may receive candidate information 680 from the receiver 610 for decoding candidates of a downlink channel (e.g., a downlink control channel) and may attempt to decode the candidate information 680 for the decoding candidates in accordance with the first TCI state.

The transmitter 640 may transmit signals 665 generated by other components of the device 605. In some examples, the transmitter 640 may be collocated with a receiver 610 in a transceiver module. For example, the transmitter 640 may be an example of aspects of the transceiver 820 described with reference to FIG. 8. The transmitter 640 may utilize a single antenna or a set of antennas. The transmitter 640 may receive information (e.g., such as a set of bits 660 indicating a subset of two or more of the set of CCs or the set of BWPs that share QCL information) for transmission and may identify time-frequency resources over which the information is to be transmitted. The transmitter 640 may modulate the information over the identified time-frequency resources in order to transmit the signal 665.

Figure 7:
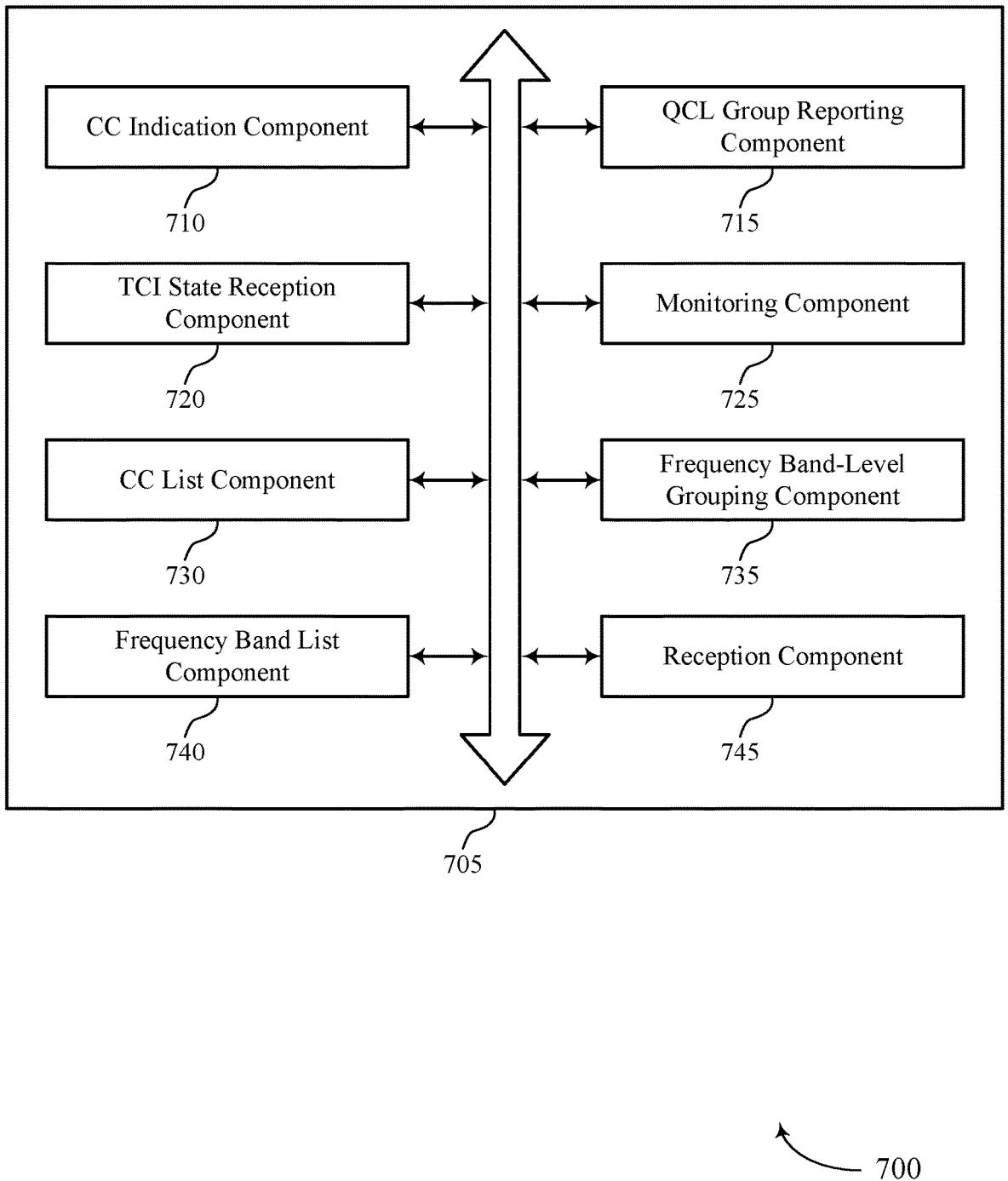
FIG. 7 shows a block diagram of a communications manager that supports reporting of multiple CCs or frequency bands that share QCL information in accordance with aspects of the present disclosure.

FIG. 7 shows a block diagram 700 of a communications manager 705 that supports reporting of multiple CCs or frequency bands that share QCL information in accordance with aspects of the present disclosure. The communications manager 705 may be an example of aspects of a communications manager 515, a communications manager 615, or a communications manager 810 described herein. The communications manager 705 may include a CC indication component 710, a QCL group reporting component 715, a TCI state reception component 720, a monitoring component 725, a CC list component 730, a frequency band-level grouping component 735, a frequency band list component 740, a reception component 745, or some combination of these components. Each of these modules may communicate, directly or indirectly, with one another (e.g., via one or more buses).

The CC indication component 710 may receive control signaling indicating a set of CCs or a set of BWPs. In some examples, receiving the control signaling includes receiving radio control signaling indicating the set of CCs or BWPs.

The QCL group reporting component 715 may transmit a group message indicating a subset of two or more of the set of CCs or the set of BWPs that share QCL information.

In some cases, the CC list component 730 may transmit the group message indicating a list that includes a set of CC identifiers or a set of BWP identifiers of the subset that share the QCL information.

In some other cases, the frequency band-level grouping component 735 may transmit the group message including a bit that is set to a defined value to indicate that the subset includes all CCs of the set of CCs that are located within a frequency band of a set of different frequency bands. In some examples, the frequency band-level grouping component 735 may transmit the group message including a bit that is set to a defined value to indicate that not all CCs of the set of CCs that are located within a frequency band of a set of different frequency bands share the QCL information. In some examples, the frequency band-level grouping component 735 may transmit a control message (e.g., an uplink control message) indicating that the subset includes a first subset of CCs of the set of CCs that are located within the frequency band that share the QCL information. Additionally, or alternatively, the frequency band-level grouping component 735 may transmit the control message indicating that the subset does not include a second subset of CCs of the set of CCs that are located within the frequency band that do not share the QCL information.

In yet some other cases, the frequency band list component 740 may transmit a list of one or more frequency bands, where the subset includes all CCs of the set of CCs or all BWPs of the set of BWPs within a first frequency band of the one or more frequency bands. In some cases, the subset of two or more of the set of CCs or the set of BWPs is an example of a first subset of two or more of the set of CCs or the set of BWPs, and a second subset of two or more of the set of CCs or the set of BWPs includes all CCs of the set of CCs or all BWPs of the set of BWPs within a second frequency band of the one or more frequency bands, where the second subset shares second QCL information. In some cases, the list indicates a starting band index and an ending band index for each of the one or more frequency bands. In some cases, the list indicates an FR for each of the one or more frequency bands. In some cases, a first FR of the one or more frequency bands is FR1 or FR2.

The TCI state reception component 720 may receive a control message (e.g., a downlink control message) indicating a first TCI state of a set of different TCI states is activated for each of the two or more of the set of CCs or the set of BWPs based on the group message. In some examples, receiving the control message includes receiving a MAC CE indicating the first TCI state.

The monitoring component 725 may monitor at least one CC or at least one BWP of the subset for a downlink transmission that is transmitted in accordance with the first TCI state.

The reception component 745 may receive a grant indicating the downlink transmission is scheduled on the at least one CC or at least one BWP of the subset. In some examples, the reception component 745 may receive, via the at least one CC or at least one BWP of the subset, the downlink transmission using a receive beam that corresponds to the first TCI state.

Figure 8:
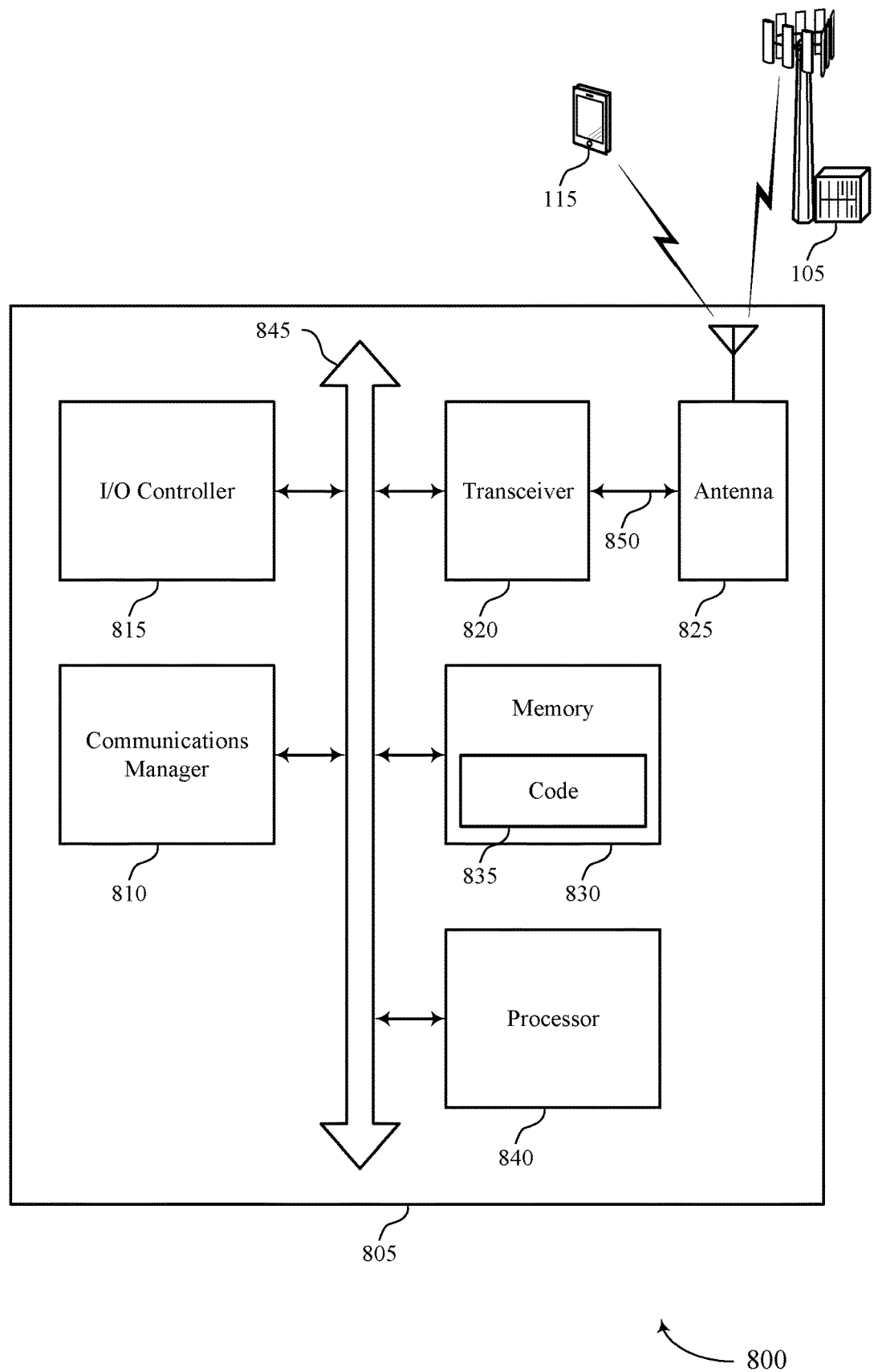
FIG. 8 shows a diagram of a system including a device that supports reporting of multiple CCs or frequency bands that share QCL information in accordance with aspects of the present disclosure.

FIG. 8 shows a diagram of a system 800 including a device 805 that supports reporting of multiple CCs or frequency bands that share QCL information in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive control signaling indicating a set of CCs or a set of BWPs, transmit a group message indicating a subset of two or more of the set of CCs or the set of BWPs that share QCL information, receive a control message indicating a first TCI state of a set of different TCI states is activated for each of the two or more of the set of CCs or the set of BWPs based on the group message, and monitor at least one CC or at least one BWP of the subset for a downlink transmission that is transmitted in accordance with the first TCI state.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets (e.g., as information 850) to the antennas for transmission, and to demodulate packets received from the antennas (e.g., as information 850).

In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting reporting of multiple CCs or frequency bands that share QCL information).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
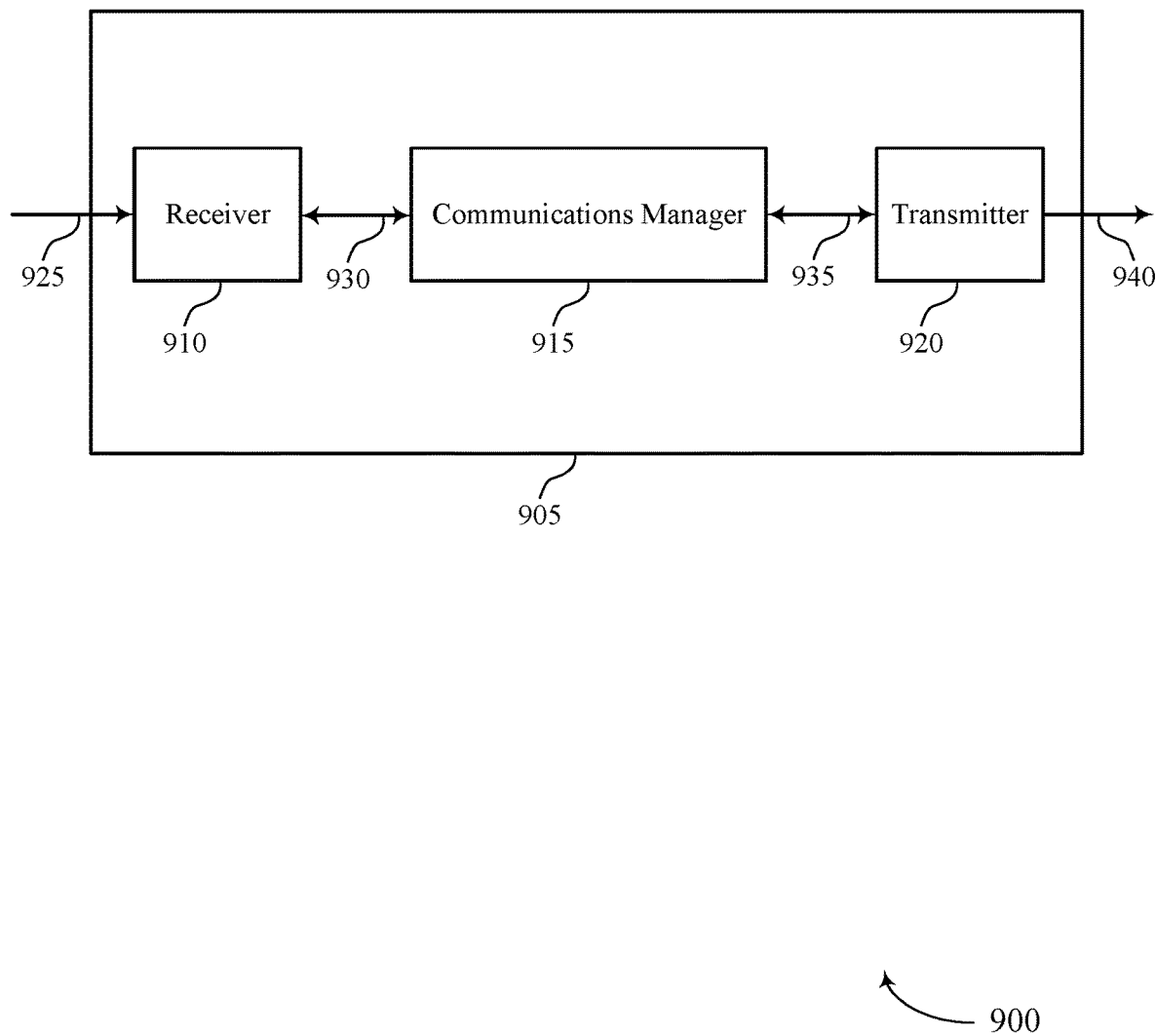
FIGS. 9 and 10 show block diagrams of devices that support reporting of multiple CCs or frequency bands that share QCL information in accordance with aspects of the present disclosure.

FIG. 9 shows a block diagram 900 of a device 905 that supports reporting of multiple CCs or frequency bands that share QCL information in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information 925 such as packets, user data, or control information associated with various information channels (e.g., control channels, data channels, or both). For example, the receiver 910 may demodulate signals received over monitored time-frequency resources to obtain bits that indicate the information 925. The receiver 910 may pass this information, as information 930, on to other components of the device 905. For example, the receiver 910 may electrically send the information 930 received from another device (e.g., a UE 115)—such as uplink control signaling, a group message, other uplink transmissions, and the like—to the communications manager 915. The receiver 910 may be an example of aspects of the transceiver 1220 described with reference to FIG. 12. The receiver 910 may utilize a single antenna or a set of antennas.

The communications manager 915 may transmit control signaling indicating a set of CCs or a set of BWPs, receive a group message indicating a subset of two or more of the set of CCs or the set of BWPs that share QCL information, transmit a control message indicating a first TCI state of a set of different TCI states is activated for each of the two or more of the set of CCs or the set of BWPs based on the group message, and transmit, via at least one CC or at least one BWP of the subset, a downlink transmission in accordance with the first TCI state. For example, the communications manager 915 may receive the group message as the information 930. Additionally, or alternatively, the communications manager 915 may transmit the control signaling, the control message indicating the first TCI state, the downlink transmission, or some combination thereof by passing information 935 (e.g., a set of payload bits for encoding) to the transmitter 920. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas. For example, the transmitter 920 may receive information 935 and transmit information 940 over a channel. In some cases, the information 935 may include payload bits for transmission, and the transmitter 920 may encode the payload bits into a message (e.g., a control message, a data message, etc.), identify time-frequency resources over which the message is to be transmitted, and modulate the transmission over the identified time-frequency resources. The transmitted message may include the information 940.

Figure 10:
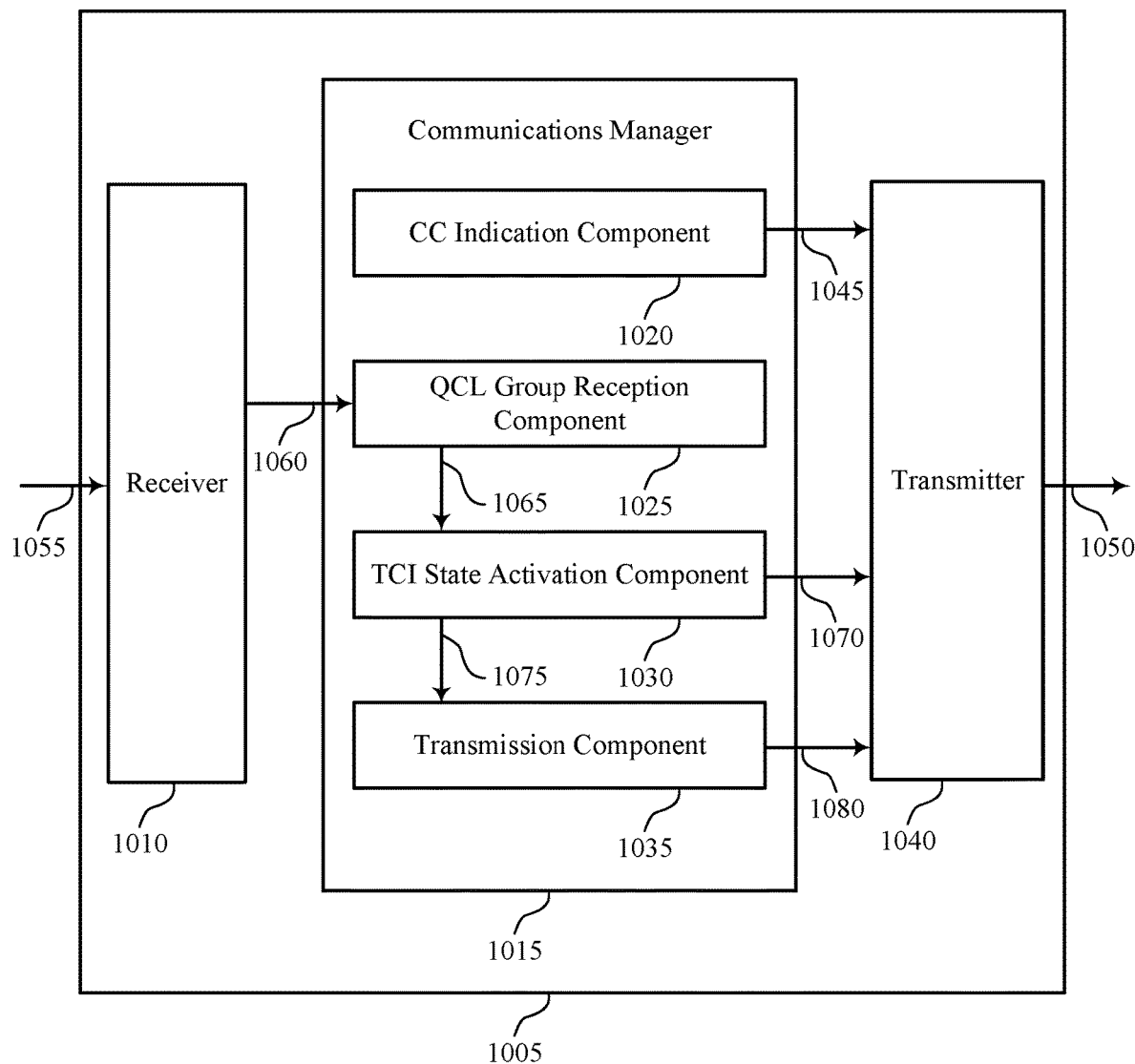

FIG. 10 shows a block diagram 1000 of a device 1005 that supports reporting of multiple CCs or frequency bands that share QCL information in accordance with aspects of the present disclosure. The device 1005 may be an example of aspects of a device 905 or a base station 105 as described herein. The device 1005 may include a receiver 1010, a communications manager 1015, and a transmitter 1040. The device 1005 may also include a processor. Each of these components may be in communication with one another (e.g., via one or more buses).

The receiver 1010 may receive information 1055 such as packets, user data, or control information associated with various information channels (e.g., control channels, data channels, and information channels related to reporting of multiple CCs or frequency bands that share QCL information, etc.). The information 1055 may be an example of a modulated signal representing payload information for a message (e.g., a control message, a data message, etc.). Information may be passed on to other components of the device 1005. For example, the receiver 1010 may electrically send information received from another device (e.g., a UE 115), such as a group message, to the communications manager 1015. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a CC indication component 1020, a QCL group reception component 1025, a TCI state activation component 1030, and a transmission component 1035. The communications manager 1015 may be an example of aspects of the communications manager 1210 described herein.

The CC indication component 1020 may transmit control signaling indicating a set of CCs or a set of BWPs. For example, the CC indication component 1020 may output a set of bits 1045 indicating a set of CCs or a set of BWPs to the transmitter 1040 for transmission in a downlink message (e.g., downlink control signaling). For example, the set of bits 1045 may indicate a set of CC indices, a set of BWP indices, a set of CC parameters, a set of BWP parameters, or a combination thereof.

The QCL group reception component 1025 may receive a group message indicating a subset of two or more of the set of CCs or the set of BWPs that share QCL information. For example, the QCL group reception component 1025 may receive a set of bits 1060 indicating the group message from the receiver 1010. The QCL group reception component 1025 may determine the subset of two or more of the set of CCs or the set of BWPs that share QCL information based on the set of bits 1060 and may output a set of bits 1065 indicating the subset to the TCI state activation component 1030.

The TCI state activation component 1030 may transmit a control message indicating a first TCI state of a set of different TCI states is activated for each of the two or more of the set of CCs or the set of BWPs based on the group message. For example, the TCI state activation component 1030 may receive the set of bits 1065 indicating the subset of two or more of the set of CCs or the set of BWPs that share QCL information. The TCI state activation component 1030 may determine that activating the first TCI state for one of the CCs or BWPs in the subset may support activating the first TCI state for each of the two or more of the set of CCs or the set of BWPs in the subset. The TCI state activation component 1030 may output a set of bits 1070 indicating the first TCI state and at least one CC or BWP of the subset to the transmitter 1040 for transmission in a downlink message (e.g., a control message). For example, the set of bits 1070 may indicate a TCI state ID and one or more CC indices, one or more BWP indices, or a combination thereof. Additionally, or alternatively, the TCI state activation component 1030 may output a set of bits 1075 indicating the activated TCI state to the transmission component 1035.

The transmission component 1035 may transmit, via at least one CC or at least one BWP of the subset, a downlink transmission in accordance with the first TCI state. For example, the transmission component 1035 may receive the set of bits 1075 indicating the activated TCI state. The transmission component 1035 may prepare a downlink message for transmission according to the activated TCI state (e.g., the first TCI state). The transmission component 1035 may output a set of bits 1080 representing the payload of the downlink transmission to the transmitter 1040 for transmission in a downlink message.

The transmitter 1040 may transmit signals 1050 generated by other components of the device 1005. In some examples, the transmitter 1040 may be collocated with a receiver 1010 in a transceiver module. For example, the transmitter 1040 may be an example of aspects of the transceiver 1220 described with reference to FIG. 12. The transmitter 1040 may utilize a single antenna or a set of antennas. The transmitter 1040 may receive information for transmission and may identify time-frequency resources over which the information is to be transmitted. The transmitter 1040 may modulate the information over the identified time-frequency resources in order to transmit the signal 1050.

Figure 11:
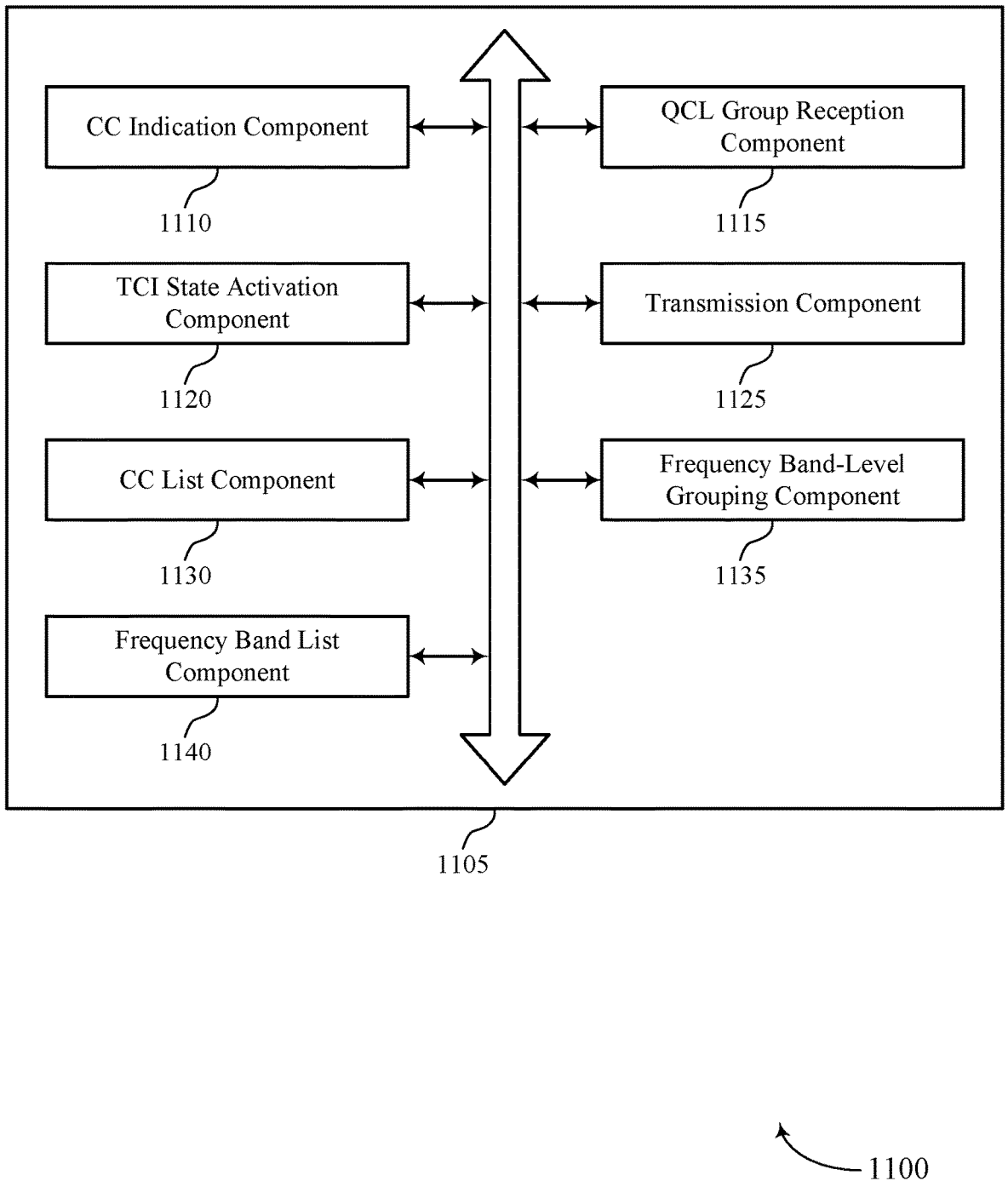
FIG. 11 shows a block diagram of a communications manager that supports reporting of multiple CCs or frequency bands that share QCL information in accordance with aspects of the present disclosure.

FIG. 11 shows a block diagram 1100 of a communications manager 1105 that supports reporting of multiple CCs or frequency bands that share QCL information in accordance with aspects of the present disclosure. The communications manager 1105 may be an example of aspects of a communications manager 915, a communications manager 1015, or a communications manager 1210 described herein. The communications manager 1105 may include a CC indication component 1110, a QCL group reception component 1115, a TCI state activation component 1120, a transmission component 1125, a CC list component 1130, a frequency band-level grouping component 1135, a frequency band list component 1140, or some combination of these components. Each of these modules may communicate, directly or indirectly, with one another (e.g., via one or more buses).

The CC indication component 1110 may transmit control signaling indicating a set of CCs or a set of BWPs. In some examples, transmitting the control signaling includes transmitting radio control signaling indicating the set of CCs or BWPs.

The QCL group reception component 1115 may receive a group message indicating a subset of two or more of the set of CCs or the set of BWPs that share QCL information.

In some cases, the CC list component 1130 may receive the group message indicating a list that includes a set of CC identifiers or a set of BWP identifiers of the subset that share the QCL information.

In some other cases, the frequency band-level grouping component 1135 may receive the group message including a bit that is set to a defined value to indicate that the subset includes all CCs of the set of CCs that are located within a frequency band of a set of different frequency bands. In some examples, the frequency band-level grouping component 1135 may receive the group message including a bit that is set to a defined value to indicate that not all CCs of the set of CCs that are located within a frequency band of a set of different frequency bands share the QCL information. In some examples, the frequency band-level grouping component 1135 may receive a control message (e.g., an uplink control message) indicating that the subset includes a first subset of CCs of the set of CCs that are located within the frequency band that share the QCL information. Additionally, or alternatively, the frequency band-level grouping component 1135 may receive the control message indicating that the subset does not include a second subset of CCs of the set of CCs that are located within the frequency band that do not share the QCL information.

In yet some other cases, the frequency band list component 1140 may receive a list of one or more frequency bands, where the subset includes all CCs of the set of CCs or all BWPs of the set of BWPs within a first frequency band of the one or more frequency bands. In some cases, the subset of two or more of the set of CCs or the set of BWPs is an example of a first subset of two or more of the set of CCs or the set of BWPs, and a second subset of two or more of the set of CCs or the set of BWPs includes all CCs of the set of CCs or all BWPs of the set of BWPs within a second frequency band of the one or more frequency bands, and where the second subset shares second QCL information. In some cases, the list indicates a starting band index and an ending band index for each of the one or more frequency bands. In some cases, the list indicates an FR for each of the one or more frequency bands. In some cases, a first FR of the one or more frequency bands is FR1 or FR2.

The TCI state activation component 1120 may transmit a control message (e.g., a downlink control message) indicating a first TCI state of a set of different TCI states is activated for each of the two or more of the set of CCs or the set of BWPs based on the group message. In some examples, transmitting the control message includes transmitting a MAC CE indicating the first TCI state.

The transmission component 1125 may transmit, via at least one CC or at least one BWP of the subset, a downlink transmission in accordance with the first TCI state. In some examples, the transmission component 1125 may transmit a grant indicating the downlink transmission is scheduled on the at least one CC or at least one BWP of the subset.

Figure 12:
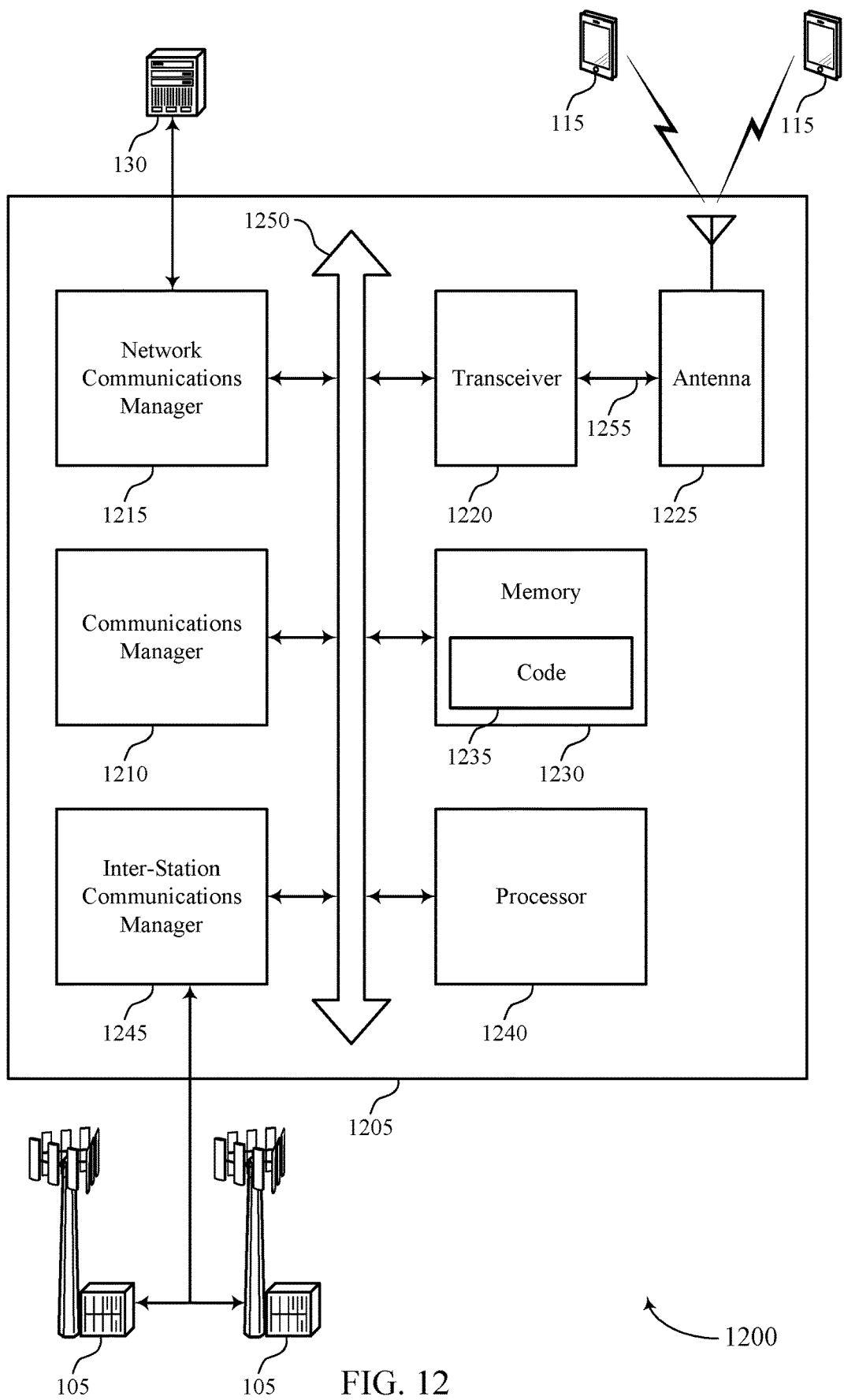
FIG. 12 shows a diagram of a system including a device that supports reporting of multiple CCs or frequency bands that share QCL information in accordance with aspects of the present disclosure.

FIG. 12 shows a diagram of a system 1200 including a device 1205 that supports reporting of multiple CCs or frequency bands that share QCL information in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may transmit control signaling indicating a set of CCs or a set of BWPs, receive a group message indicating a subset of two or more of the set of CCs or the set of BWPs that share QCL information, transmit a control message indicating a first TCI state of a set of different TCI states is activated for each of the two or more of the set of CCs or the set of BWPs based on the group message, and transmit, via at least one CC or at least one BWP of the subset, a downlink transmission in accordance with the first TCI state.

The network communications manager 1215 may manage communications with the core network 130 (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets (e.g., as information 1255) to the antennas for transmission, and to demodulate packets received from the antennas (e.g., as information 1255).

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting reporting of multiple CCs or frequency bands that share QCL information).

The inter-station communications manager 1245 may manage communications with other base station 105 and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
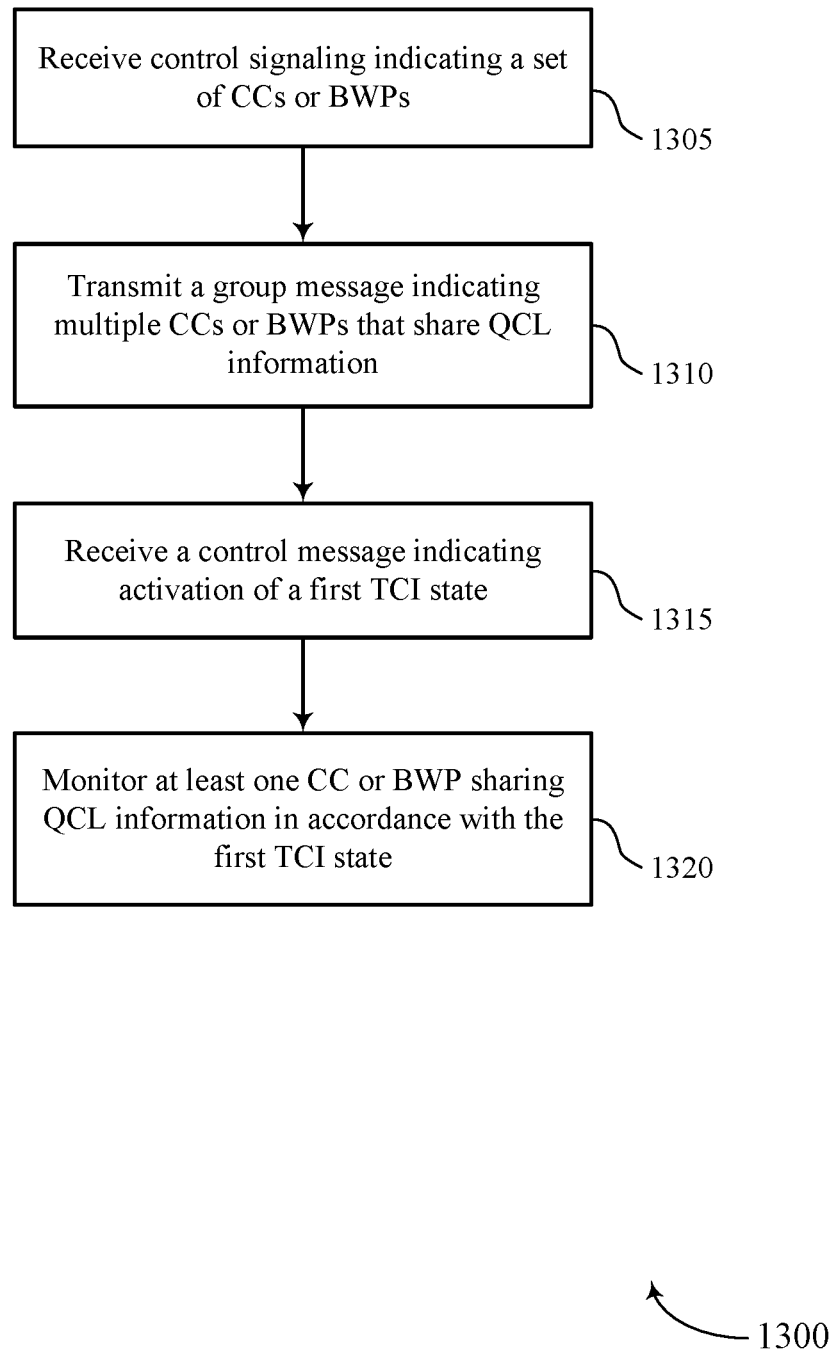
FIGS. 13 through 15 show flowcharts illustrating methods that support reporting of multiple CCs or frequency bands that share QCL information in accordance with aspects of the present disclosure.

FIG. 13 shows a flowchart illustrating a method 1300 that supports reporting of multiple CCs or frequency bands that share QCL information in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally, or alternatively, a UE may perform aspects of the functions described below using special-purpose hardware.

At 1305, the UE may receive control signaling indicating a set of CCs or a set of BWPs. For example, the UE may identify time-frequency resources over which the control signaling is transmitted and may demodulate the control signaling over the identified time-frequency resources. The UE may decode the control signaling to obtain bits that indicate the set of CCs or the set of BWPs, for example, using CC indices, BWP indices, CC parameters, BWP parameters, or a combination thereof. The operations of 1305 may be performed according to the methods described herein. In some examples, aspects of the operations of 1305 may be performed by a CC indication component as described with reference to FIGS. 5 through 8.

At 1310, the UE may transmit a group message indicating a subset of two or more of the set of CCs or the set of BWPs that share QCL information. For example, the UE may identify time-frequency resources over which the group message is to be transmitted. The UE may modulate the group message over the identified time-frequency resources in order to transmit the group message (e.g., on an uplink channel to a base station 105). The operations of 1310 may be performed according to the methods described herein. In some examples, aspects of the operations of 1310 may be performed by a QCL group reporting component as described with reference to FIGS. 5 through 8.

At 1315, the UE may receive a control message indicating a first TCI state of a set of different TCI states is activated for each of the two or more of the set of CCs or the set of BWPs based on the group message. For example, the UE may identify time-frequency resources over which the control message is transmitted and may demodulate the control message over the identified time-frequency resources. The UE may decode the control message to obtain bits that indicate the first TCI state, at least one CC of the subset, at least one BWP of the subset, or a combination thereof. The operations of 1315 may be performed according to the methods described herein. In some examples, aspects of the operations of 1315 may be performed by a TCI state reception component as described with reference to FIGS. 5 through 8.

At 1320, the UE may monitor at least one CC or at least one BWP of the subset for a downlink transmission that is transmitted in accordance with the first TCI state. For example, the UE may identify time-frequency resources over which a downlink transmission may be transmitted (e.g., in a decoding candidate) and may demodulate the decoding candidate. The UE may attempt to decode the decoding candidate to determine if a downlink transmission is present. For example, if a checking function passes for decoding the decoding candidate, the UE may determine that a downlink transmission is received in the decoding candidate. The UE may obtain bits from the successful decoding process that indicate the downlink information included in the downlink transmission. The operations of 1320 may be performed according to the methods described herein. In some examples, aspects of the operations of 1320 may be performed by a monitoring component as described with reference to FIGS. 5 through 8.

Figure 14:
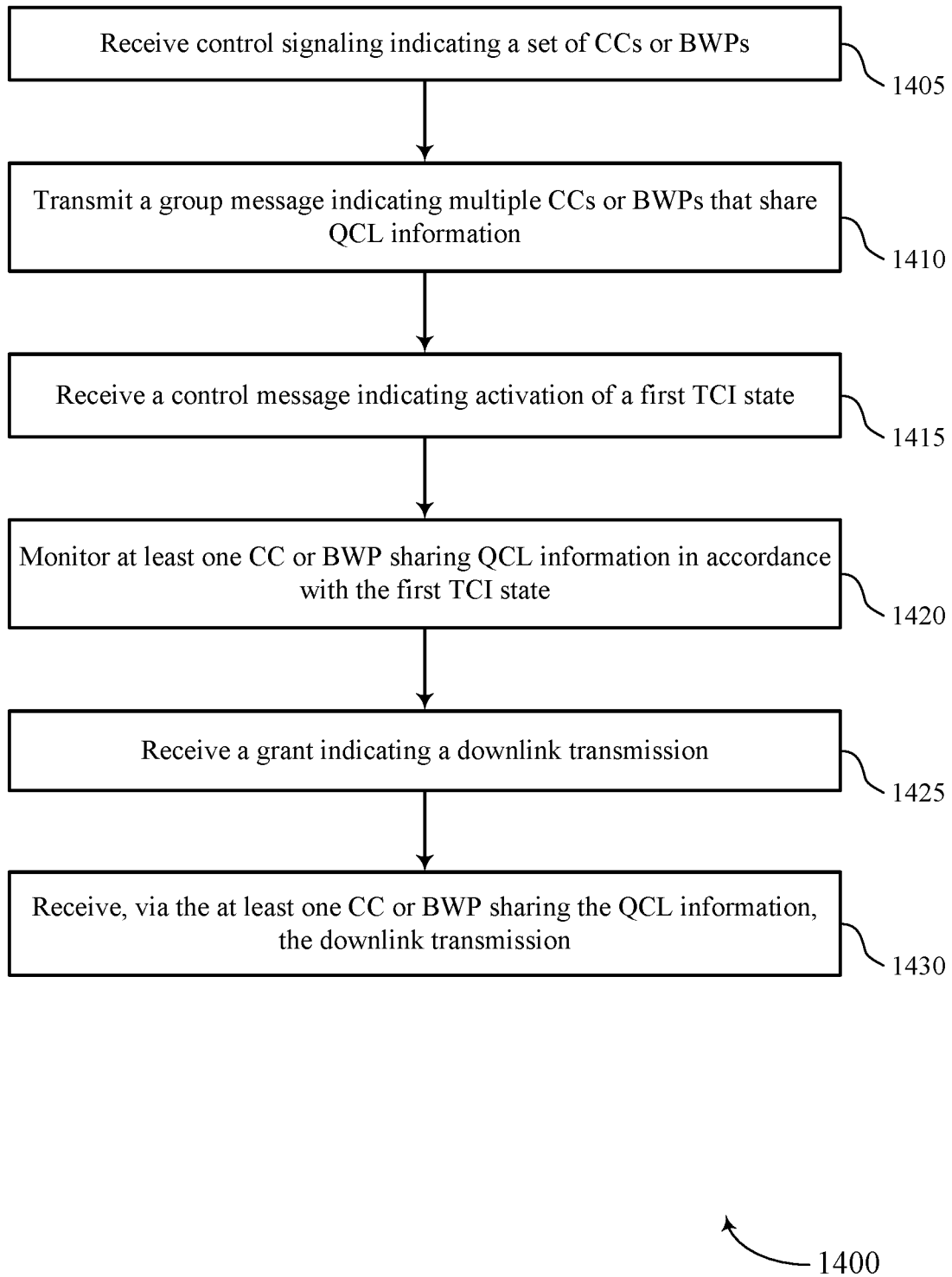

FIG. 14 shows a flowchart illustrating a method 1400 that supports reporting of multiple CCs or frequency bands that share QCL information in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described below. Additionally, or alternatively, a UE may perform aspects of the functions described below using special-purpose hardware.

At 1405, the UE may receive control signaling indicating a set of CCs or a set of BWPs. For example, the UE may identify time-frequency resources over which the control signaling is transmitted and may demodulate the control signaling over the identified time-frequency resources. The UE may decode the control signaling to obtain bits that indicate the set of CCs or the set of BWPs, for example, using CC indices, BWP indices, CC parameters, BWP parameters, or a combination thereof. The operations of 1405 may be performed according to the methods described herein. In some examples, aspects of the operations of 1405 may be performed by a CC indication component as described with reference to FIGS. 5 through 8.

At 1410, the UE may transmit a group message indicating a subset of two or more of the set of CCs or the set of BWPs that share QCL information. For example, the UE may identify time-frequency resources over which the group message is to be transmitted. The UE may modulate the group message over the identified time-frequency resources in order to transmit the group message (e.g., on an uplink channel to a base station 105). The operations of 1410 may be performed according to the methods described herein. In some examples, aspects of the operations of 1410 may be performed by a QCL group reporting component as described with reference to FIGS. 5 through 8.

At 1415, the UE may receive a control message indicating a first TCI state of a set of different TCI states is activated for each of the two or more of the set of CCs or the set of BWPs based on the group message. For example, the UE may identify time-frequency resources over which the control message is transmitted and may demodulate the control message over the identified time-frequency resources. The UE may decode the control message to obtain bits that indicate the first TCI state, at least one CC of the subset, at least one BWP of the subset, or a combination thereof. The operations of 1415 may be performed according to the methods described herein. In some examples, aspects of the operations of 1415 may be performed by a TCI state reception component as described with reference to FIGS. 5 through 8.

At 1420, the UE may monitor at least one CC or at least one BWP of the subset for a downlink transmission that is transmitted in accordance with the first TCI state. For example, the UE may identify time-frequency resources over which a downlink transmission may be transmitted (e.g., based on a grant) and may demodulate the resources indicated by the grant, as described herein. The operations of 1420 may be performed according to the methods described herein. In some examples, aspects of the operations of 1420 may be performed by a monitoring component as described with reference to FIGS. 5 through 8.

At 1425, the UE may receive a grant indicating the downlink transmission is scheduled on the at least one CC or at least one BWP of the subset. For example, the UE may identify time-frequency resources over which the grant is transmitted and may demodulate the grant over the identified time-frequency resources. The UE may decode the grant to obtain bits that indicate the resources for receiving the downlink transmission. The operations of 1425 may be performed according to the methods described herein. In some examples, aspects of the operations of 1425 may be performed by a reception component as described with reference to FIGS. 5 through 8.

At 1430, the UE may receive, via the at least one CC or at least one BWP of the subset, the downlink transmission using a receive beam that corresponds to the first TCI state. For example, the UE may identify time-frequency resources over which the downlink transmission is transmitted based on the grant. The UE may demodulate the downlink transmission over the identified time-frequency resources and may decode the downlink transmission based on the receive beam corresponding to the first TCI state. The UE may obtain bits based on the decoding process that indicate downlink information included in the downlink transmission. The operations of 1430 may be performed according to the methods described herein. In some examples, aspects of the operations of 1430 may be performed by a reception component as described with reference to FIGS. 5 through 8.

Figure 15:
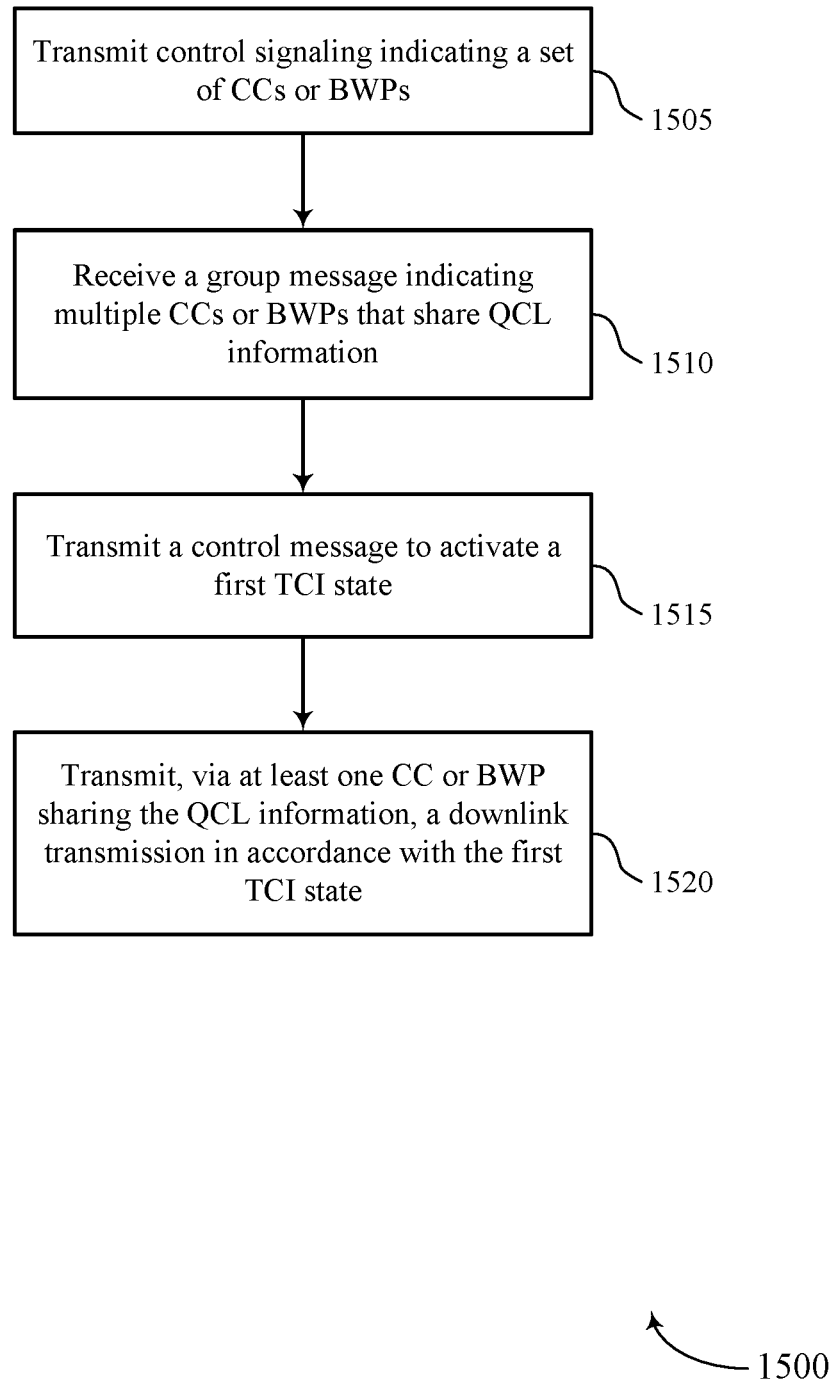

FIG. 15 shows a flowchart illustrating a method 1500 that supports reporting of multiple CCs or frequency bands that share QCL information in accordance with aspects of the present disclosure. The operations of method 1500 may be implemented by a base station 105 or its components as described herein. For example, the operations of method 1500 may be performed by a communications manager as described with reference to FIGS. 9 through 12. In some examples, a base station may execute a set of instructions to control the functional elements of the base station to perform the functions described below. Additionally, or alternatively, a base station may perform aspects of the functions described below using special-purpose hardware.

At 1505, the base station may transmit control signaling indicating a set of CCs or a set of BWPs. For example, the base station may identify time-frequency resources over which the control signaling is to be transmitted. The base station may modulate the control signaling over the identified time-frequency resources in order to transmit the control signaling (e.g., on a downlink control channel to a UE 115). The operations of 1505 may be performed according to the methods described herein. In some examples, aspects of the operations of 1505 may be performed by a CC indication component as described with reference to FIGS. 9 through 12.

At 1510, the base station may receive a group message indicating a subset of two or more of the set of CCs or the set of BWPs that share QCL information. For example, the base station may identify time-frequency resources over which the group message is transmitted and may demodulate the group message over the identified time-frequency resources. The base station may decode the group message to obtain bits that indicate the subset of two or more of the set of CCs or the set of BWPs that share QCL information, for example, using CC indices, BWP indices, CC parameters, BWP parameters, or a combination thereof. The operations of 1510 may be performed according to the methods described herein. In some examples, aspects of the operations of 1510 may be performed by a QCL group reception component as described with reference to FIGS. 9 through 12.

At 1515, the base station may transmit a control message indicating a first TCI state of a set of different TCI states is activated for each of the two or more of the set of CCs or the set of BWPs based on the group message. For example, the base station may identify time-frequency resources over which the control message is to be transmitted. The base station may modulate the control message over the identified time-frequency resources in order to transmit the control message (e.g., on a downlink control channel to the UE 115). The operations of 1515 may be performed according to the methods described herein. In some examples, aspects of the operations of 1515 may be performed by a TCI state activation component as described with reference to FIGS. 9 through 12.

At 1520, the base station may transmit, via at least one CC or at least one BWP of the subset, a downlink transmission in accordance with the first TCI state. For example, the base station may identify time-frequency resources over which the downlink transmission is to be transmitted. The base station may modulate the downlink transmission over the identified time-frequency resources in order to transmit the downlink transmission. The operations of 1520 may be performed according to the methods described herein. In some examples, aspects of the operations of 1520 may be performed by a transmission component as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. As used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications by a user equipment, comprising:
   receiving control signaling indicating a plurality of component carriers or a plurality of bandwidth parts;
   transmitting a group message indicating a subset of two or more of the plurality of component carriers or the plurality of bandwidth parts that share quasi co-location information;
   receiving a control message indicating a first transmission configuration indicator state of a plurality of different transmission configuration indicator states is activated for each of the two or more of the plurality of component carriers or the plurality of bandwidth parts based at least in part on the group message; and
   monitoring at least one component carrier or at least one bandwidth part of the subset for a downlink transmission that is transmitted in accordance with the first transmission configuration indicator state.

2. The method of claim 1, wherein transmitting the group message comprises:
   transmitting the group message indicating a list that includes a plurality of component carrier identifiers or a plurality of bandwidth part identifiers of the subset that share the quasi co-location information.

3. The method of claim 1, wherein transmitting the group message comprises:
   transmitting the group message comprising a bit that is set to a defined value to indicate that the subset includes all component carriers of the plurality of component carriers that are located within a frequency band of a plurality of different frequency bands.

4. The method of claim 1, wherein transmitting the group message comprises:
   transmitting the group message comprising a bit that is set to a defined value to indicate that not all component carriers of the plurality of component carriers that are located within a frequency band of a plurality of different frequency bands share the quasi co-location information.

5. The method of claim 4, wherein the control message comprises a downlink control message, the method further comprising:
transmitting an uplink control message indicating that the subset includes a first subset of component carriers of the plurality of component carriers that are located within the frequency band that share the quasi co-location information.

6. The method of claim 5, wherein transmitting the uplink control message comprises:
transmitting the uplink control message indicating that the subset does not include a second subset of component carriers of the plurality of component carriers that are located within the frequency band that do not share the quasi co-location information.

7. The method of claim 1, wherein transmitting the group message comprises:
transmitting a list of one or more frequency bands, wherein the subset includes all component carriers of the plurality of component carriers or all bandwidth parts of the plurality of bandwidth parts within a first frequency band of the one or more frequency bands.

8. The method of claim 7, wherein:
the subset of two or more of the plurality of component carriers or the plurality of bandwidth parts comprises a first subset of two or more of the plurality of component carriers or the plurality of bandwidth parts; and
a second subset of two or more of the plurality of component carriers or the plurality of bandwidth parts includes all component carriers of the plurality of component carriers or all bandwidth parts of the plurality of bandwidth parts within a second frequency band of the one or more frequency bands, and wherein the second subset shares second quasi co-location information.

9. The method of claim 7, wherein the list indicates a starting band index and an ending band index for each of the one or more frequency bands, a frequency range for each of the one or more frequency bands, or a combination thereof.

10. The method of claim 7, wherein a first frequency range of the one or more frequency bands is frequency range 1 (FR1) or frequency range 2 (FR2).

11. The method of claim 1, further comprising:
receiving a grant indicating the downlink transmission is scheduled on the at least one component carrier or at least one bandwidth part of the subset; and
receiving, via the at least one component carrier or at least one bandwidth part of the subset, the downlink transmission using a receive beam that corresponds to the first transmission configuration indicator state.

12. The method of claim 1, wherein:
receiving the control signaling comprises receiving radio control signaling indicating the plurality of component carriers or bandwidth parts; and
receiving the control message comprises receiving a medium access control (MAC) control element (CE) indicating the first transmission configuration indicator state.

13. A method for wireless communications by a base station, comprising:
transmitting control signaling indicating a plurality of component carriers or a plurality of bandwidth parts;
receiving a group message indicating a subset of two or more of the plurality of component carriers or the plurality of bandwidth parts that share quasi co-location information;
transmitting a control message indicating a first transmission configuration indicator state of a plurality of different transmission configuration indicator states is activated for each of the two or more of the plurality of component carriers or the plurality of bandwidth parts based at least in part on the group message; and
transmitting, via at least one component carrier or at least one bandwidth part of the subset, a downlink transmission in accordance with the first transmission configuration indicator state.

14. The method of claim 13, wherein receiving the group message comprises:
receiving the group message indicating a list that includes a plurality of component carrier identifiers or a plurality of bandwidth part identifiers of the subset that share the quasi co-location information.

15. The method of claim 13, wherein receiving the group message comprises:
receiving the group message comprising a bit that is set to a defined value to indicate that the subset includes all component carriers of the plurality of component carriers that are located within a frequency band of a plurality of different frequency bands.

16. The method of claim 13, wherein receiving the group message comprises:
receiving the group message comprising a bit that is set to a defined value to indicate that not all component carriers of the plurality of component carriers that are located within a frequency band of a plurality of different frequency bands share the quasi co-location information.

17. The method of claim 16, wherein the control message comprises a downlink control message, the method further comprising:
receiving an uplink control message indicating that the subset includes a first subset of component carriers of the plurality of component carriers that are located within the frequency band that share the quasi co-location information.

18. The method of claim 17, wherein receiving the uplink control message comprises:
receiving the uplink control message indicating that the subset does not include a second subset of component carriers of the plurality of component carriers that are located within the frequency band that do not share the quasi co-location information.

19. The method of claim 13, wherein receiving the group message comprises:
receiving a list of one or more frequency bands, wherein the subset includes all component carriers of the plurality of component carriers or all bandwidth parts of the plurality of bandwidth parts within a first frequency band of the one or more frequency bands.

20. The method of claim 19, wherein:
the subset of two or more of the plurality of component carriers or the plurality of bandwidth parts comprises a first subset of two or more of the plurality of component carriers or the plurality of bandwidth parts; and
a second subset of two or more of the plurality of component carriers or the plurality of bandwidth parts includes all component carriers of the plurality of component carriers or all bandwidth parts of the plurality of bandwidth parts within a second frequency band of the one or more frequency bands, and wherein the second subset shares second quasi co-location information.

21. The method of claim 13, further comprising:

transmitting a grant indicating the downlink transmission is scheduled on the at least one component carrier or at least one bandwidth part of the subset.

22. The method of claim 13, wherein:

transmitting the control signaling comprises transmitting radio control signaling indicating the plurality of component carriers or bandwidth parts; and transmitting the control message comprises transmitting a medium access control (MAC) control element (CE) indicating the first transmission configuration indicator state.

23. An apparatus for wireless communications by a user equipment, comprising:

a processor;

memory coupled with the processor; and instructions stored in the memory and executable by the processor to cause the apparatus to:

receive control signaling indicating a plurality of component carriers or a plurality of bandwidth parts;

transmit a group message indicating a subset of two or more of the plurality of component carriers or the plurality of bandwidth parts that share quasi co-location information;

receive a control message indicating a first transmission configuration indicator state of a plurality of different transmission configuration indicator states is activated for each of the two or more of the plurality of component carriers or the plurality of bandwidth parts based at least in part on the group message; and monitor at least one component carrier or at least one bandwidth part of the subset for a downlink transmission that is transmitted in accordance with the first transmission configuration indicator state.

24. The apparatus of claim 23, wherein the instructions to transmit the group message are executable by the processor to cause the apparatus to:

transmit the group message indicating a list that includes a plurality of component carrier identifiers or a plurality of bandwidth part identifiers of the subset that share the quasi co-location information.

25. The apparatus of claim 23, wherein the instructions to transmit the group message are executable by the processor to cause the apparatus to:

transmit the group message comprising a bit that is set to a defined value to indicate that the subset includes all component carriers of the plurality of component carriers that are located within a frequency band of a plurality of different frequency bands.

26. The apparatus of claim 23, wherein the instructions to transmit the group message are executable by the processor to cause the apparatus to:

transmit the group message comprising a bit that is set to a defined value to indicate that not all component carriers of the plurality of component carriers that are located within a frequency band of a plurality of different frequency bands share the quasi co-location information.

27. The apparatus of claim 23, wherein the instructions to transmit the group message are executable by the processor to cause the apparatus to:

transmit a list of one or more frequency bands, wherein the subset includes all component carriers of the plurality of component carriers or all bandwidth parts of the plurality of bandwidth parts within a first frequency band of the one or more frequency bands.

28. An apparatus for wireless communications by a base station, comprising:

a processor;

memory coupled with the processor; and instructions stored in the memory and executable by the processor to cause the apparatus to:

transmit control signaling indicating a plurality of component carriers or a plurality of bandwidth parts;

receive a group message indicating a subset of two or more of the plurality of component carriers or the plurality of bandwidth parts that share quasi co-location information;

transmit a control message indicating a first transmission configuration indicator state of a plurality of different transmission configuration indicator states is activated for each of the two or more of the plurality of component carriers or the plurality of bandwidth parts based at least in part on the group message; and transmit, via at least one component carrier or at least one bandwidth part of the subset, a downlink transmission in accordance with the first transmission configuration indicator state.

29. The apparatus of claim 28, wherein the instructions to receive the group message are executable by the processor to cause the apparatus to:

receive the group message indicating a list that includes a plurality of component carrier identifiers or a plurality of bandwidth part identifiers of the subset that share the quasi co-location information.

30. The apparatus of claim 28, wherein the instructions to receive the group message are executable by the processor to cause the apparatus to:

receive the group message comprising a bit that is set to a defined value to indicate that the subset includes all component carriers of the plurality of component carriers that are located within a frequency band of a plurality of different frequency bands.

* * * * *